United States Patent
Yoshida et al.

(10) Patent No.: US 9,417,112 B2
(45) Date of Patent: *Aug. 16, 2016

(54) LIQUID CONSUMPTION DEVICE HAVING HOLDER AND DETECTING SECTION

(71) Applicant: SEIKO EPSON CORPORATION, Tokyo (JP)

(72) Inventors: Junpei Yoshida, Nagano (JP); Yuichi Nishihara, Nagano (JP); Takayuki Yazawa, Nagano (JP); Hidetoshi Yokoyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 279 days.

This patent is subject to a terminal disclaimer.

(21) Appl. No.: 13/753,016

(22) Filed: Jan. 29, 2013

(65) Prior Publication Data

US 2013/0320248 A1    Dec. 5, 2013

(30) Foreign Application Priority Data

May 30, 2012  (JP) .................................. 2012-122792

(51) Int. Cl.
| | | |
|---|---|---|
| *G01N 15/06* | (2006.01) | |
| *H01J 3/14* | (2006.01) | |
| *G01F 23/292* | (2006.01) | |
| *B41J 2/175* | (2006.01) | |

(52) U.S. Cl.
CPC ........... *G01F 23/2925* (2013.01); *B41J 2/1753* (2013.01); *B41J 2/17553* (2013.01); *B41J 2/17566* (2013.01); *G01F 23/2921* (2013.01); *B41J 2002/17573* (2013.01)

(58) Field of Classification Search
CPC .............................. G01F 23/2925; G06F 15/00
USPC .............. 250/216, 221, 573–577; 347/1, 5–7, 347/84–86
See application file for complete search history.

(56) References Cited

U.S. PATENT DOCUMENTS

| 6,361,136 | B1 | 3/2002 | Watanabe et al. |
| 6,767,075 | B1 * | 7/2004 | Takada ................... B41J 2/1752 347/19 |
| 7,918,547 | B2 | 4/2011 | Hatasa et al. |
| 8,662,648 | B2 * | 3/2014 | Kamiyanagi et al. ........... 347/86 |
| 2004/0041855 | A1 * | 3/2004 | Fujikawa et al. ................. 347/7 |
| 2005/0024454 | A1 | 2/2005 | Hayamizu et al. |
| 2009/0219310 | A1 | 9/2009 | Kondo |

FOREIGN PATENT DOCUMENTS

| JP | 10-232157 A | 9/1998 |
| JP | 10-337880 A | 12/1998 |
| JP | 2000-108367 A | 4/2000 |
| JP | 2001-246760 A | 9/2001 |
| JP | 2002-264355 A | 9/2002 |
| JP | 2002-273899 A | 9/2002 |
| JP | 2002-292888 A | 10/2002 |

(Continued)

*Primary Examiner* — Pascal M Bui Pho
(74) *Attorney, Agent, or Firm* — Global IP Counselors, LLP

(57) ABSTRACT

A liquid consumption device of the present invention has a holder in which an opening section is provided in a position to face a prism of an ink cartridge, a light emitting section, and a light receiving section. The holder has a region that changes a light amount of the reflected light emitted from the light emitting section and received by the light receiving section in a position spaced apart from the opening section at a predetermined distance in a main scanning direction.

14 Claims, 16 Drawing Sheets

(56) References Cited

FOREIGN PATENT DOCUMENTS

| | | | |
|---|---|---|---|
| JP | 2002-335006 A | 11/2002 |
| JP | 2002-370372 A | 12/2002 |
| JP | 2003-251819 A | 9/2003 |
| JP | 2005-022356 A | 1/2005 |
| JP | 2009-208297 A | 9/2009 |

\* cited by examiner

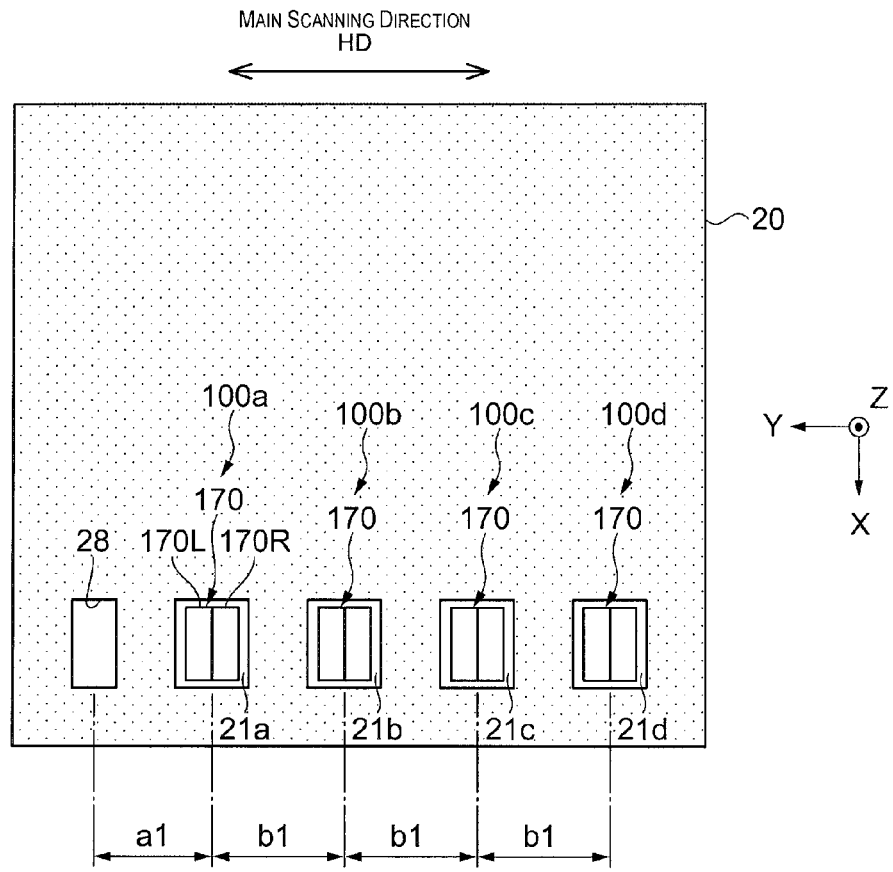
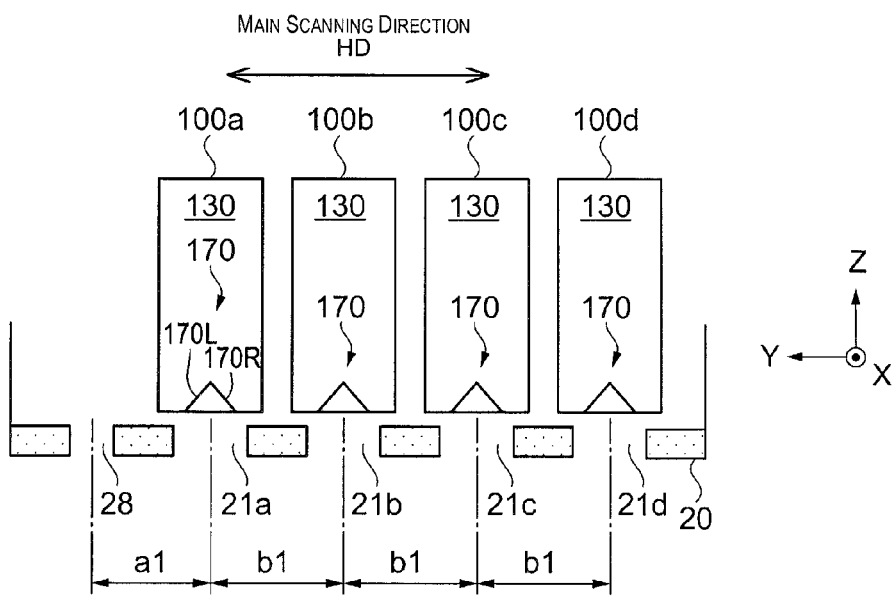

LIQUID CONSUMPTION DEVICE HAVING HOLDER AND DETECTING SECTION

TECHNICAL FIELD

The present invention relates to a liquid consumption device.

BACKGROUND ART

Generally, an ink cartridge that is a removable liquid reservoir is attached to an ink-jet type printing device that is an example of the liquid consumption device. One type of the ink cartridge has a prism to optically detect a remaining state of ink in the inside. For example, in Patent Document 1, a prism is provided in an ink cartridge of a printing device, and a remaining state of ink is optically detected. Also, by providing a reflective member to be aligned with the prism of the ink cartridge and emitting light thereto, a boundary position between the reflective member and sections other than the reflective member is calculated. Then, based on the calculated boundary position, the position of the prism is corrected, so that reflected light from the prism can be received in a correct position.

PRIOR ART DOCUMENTS

Patent Documents

[Patent Document 1] Japanese Laid-open Patent Publication No. 2005-22356

SUMMARY OF THE INVENTION

Object the Invention is to Achieve

In Patent Document 1, however, the reflective member is provided in the ink cartridge. Therefore, the reflective member needs to be provided in each ink cartridge that is consumable goods, which increases the cost of the ink cartridge.

Means of Achieving the Object

The present invention has been made to at least partly address the above-described circumstances, and can be implemented as the following aspects or application examples.

[Application Example 1] A liquid consumption device has a holder to which a liquid reservoir section provided with a prism is attached, an opening section being provided in a position to face the prism of the attached liquid reservoir section, a light emitting section that emits light, a light receiving section that receives reflected light of light emitted from the light emitting section, and a moving section that moves the holder relative to the light emitting section and the light receiving section in a main scanning direction. The holder has a region that changes a light amount of the reflected light emitted from the light emitting section and received by the light receiving section in a position spaced apart from the opening section at a predetermined distance in the main scanning direction.

With the above-described liquid consumption device, the opening section is provided in a position to face the prism of the holder, and the region that changes a light amount of the reflected light emitted from the light emitting section and received by the light receiving section is provided in a position spaced apart from the opening section at a predetermined distance in the main scanning direction. Therefore, a correct position of the prism spaced apart at a predetermined distance can be optically obtained taking the position of the region for the starting point based on the reflected light received by the light receiving section. Also, since the region is provided in the holder, not in the ink cartridge, the cost of the ink cartridge can be reduced compared to the case where the region is provided in each ink cartridge.

[Application Example 2] In the liquid consumption device, the region that changes a light amount of the reflected light includes a reflective region that reflects the reflected light toward the light receiving section, and a non-reflective region that controls reflection of the reflected light toward the light receiving section.

With the above-described liquid consumption device, a reference position on the holder can be specified based on reflected light received by the light receiving section when light is emitted to the reflective region and reflected light received by the light receiving section when light is emitted to the non-reflective region, and the position of the prism spaced apart at a predetermined distance can be obtained taking the reference position for the starting point.

[Application Example 3] In the liquid consumption device, the reflective region is provided on a bottom surface of a recessed portion formed in the holder so as to face the light emitting section and the light receiving section.

With the above-described liquid consumption device, the reflective region is provided on the bottom surface of the recessed portion formed in the holder so as to face the light emitting section and the light receiving section. Therefore, when light is emitted to the reflective region, the light receiving section can receive a large light amount of reflected light in which noise light other than light from the reflective region is controlled. As a result, the accuracy can be improved in specifying the reference position on the holder.

[Application Example 4] In the liquid consumption device, the non-reflective region has a surface inclined with respect to the main scanning direction.

With the above-described liquid consumption device, since the non-reflective region has a surface inclined with respect to the main scanning direction, reflected light on the non-reflective region can be prevented from entering the light receiving section, and therefore, the accuracy can be improved in specifying the reference position on the holder.

[Application Example 5] In the liquid consumption device, the non-reflective region has a surface inclined with respect to a bottom surface of the prism.

With the above-described liquid consumption device, since the non-reflective region has a surface inclined with respect to the bottom surface of the prism, reflected light on the non-reflective region can be prevented from entering the light receiving section, and therefore, the accuracy can be improved in specifying the reference position on the holder.

[Application Example 6] In the liquid consumption device, the non-reflective region is disposed at both ends of the reflective region in the main scanning direction.

With the above-described liquid consumption device, the non-reflective region is disposed at both ends of the reflective region in the main scanning direction. Therefore, the reflective region and the non-reflective region can be distinguished effectively based on reflected light received by the light receiving section when light is emitted to the reflective region and reflected light received by the light receiving section when light is emitted to the non-reflective region at both ends, and the accuracy can be improved in specifying the reference position on the holder.

[Application Example 7] In the liquid consumption device, the reflective region is disposed at both ends of the non-reflective region in the main scanning direction.

With the above-described liquid consumption device, the reflective region is disposed at both ends of the non-reflective region in the main scanning direction. Therefore, the reflective region and the non-reflective region can be distinguished effectively based on reflected light received by the light receiving section when light is emitted to the reflective region at both ends and reflected light received by the light receiving section when light is emitted to the non-reflective region, and the accuracy can be improved in specifying the reference position on the holder.

[Application Example 8] In the liquid consumption device, the non-reflective region is an opening region.

With the above-described liquid consumption device, since the non-reflective region is an opening region, light emitted to the non-reflective region can be prevented from entering the light receiving section, and the accuracy can be improved in specifying the reference position on the holder.

[Application Example 9] In the liquid consumption device, the reflective region is a bottom surface of the holder.

With the above-described liquid consumption device, the bottom surface of the holder is used as the reflective region. Therefore, there is no need to newly provide a member for the reflective region in the holder, and the cost of the holder can be reduced.

[Application Example 10] In the liquid consumption device, the light emitting section emits a light amount, that is larger than a light amount emitted toward the prism, toward the reflective region.

With the above-described liquid consumption device, the light emitting section emits a light amount, that is larger than a light amount emitted toward the prism, toward the reflective region.

Therefore, the light receiving section can obtain a sufficient light amount to specify the reference position on the holder even in a case where the bottom surface of the holder is used as the reflective region.

BRIEF DESCRIPTION OF THE DRAWINGS

FIGS. 14A and 14B are diagrams that explain a configuration of the holder according to a second embodiment.

DETAILED DESCRIPTION OF THE EMBODIMENTS (First Embodiment)

Hereinafter, a printing device as a liquid consumption device according the first embodiment will be described with reference to the drawings.

<Configuration of Printing Device>

Figure 1:
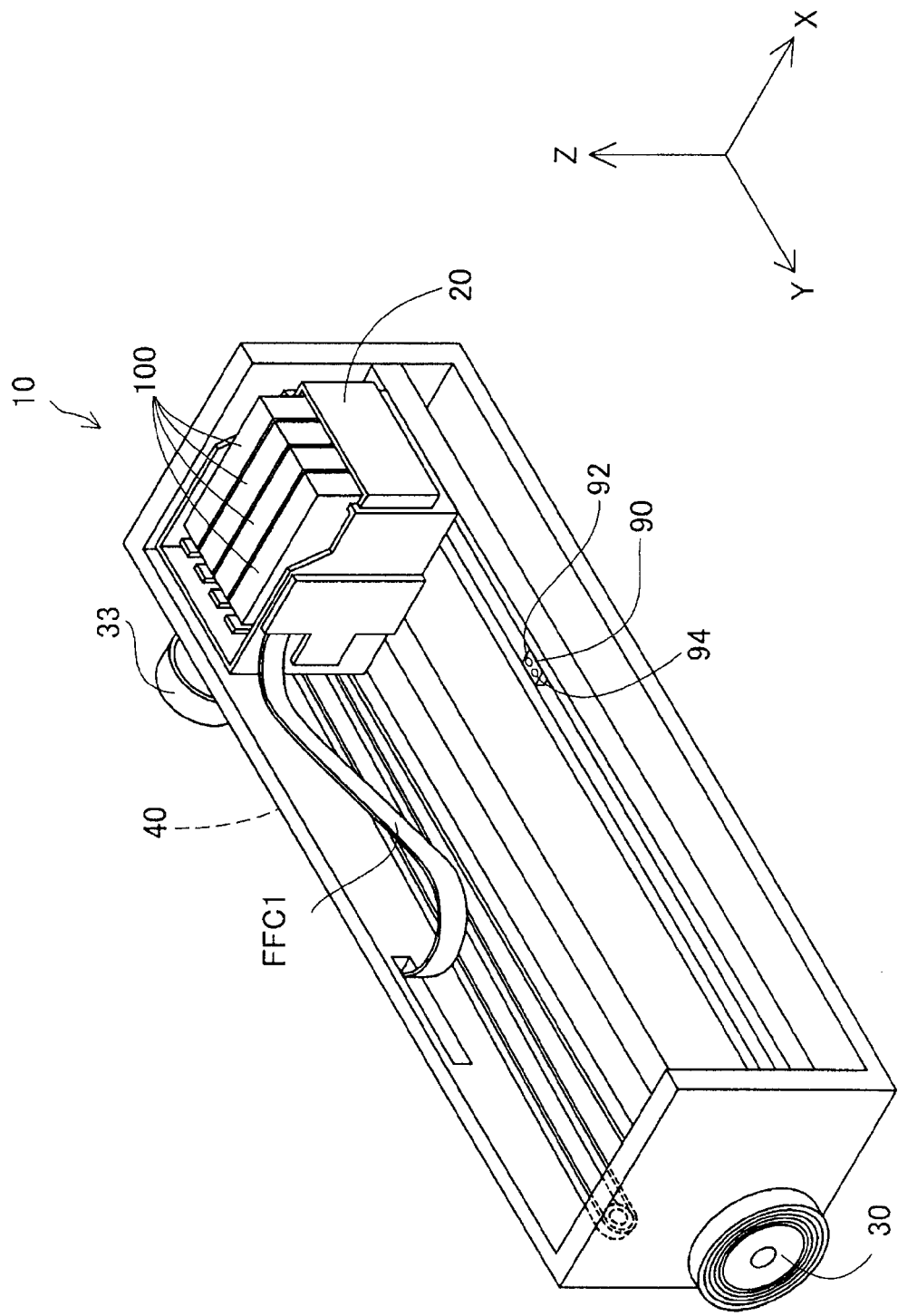
FIG. 1 is a perspective view of a main part of a printing device.
Figure 2:
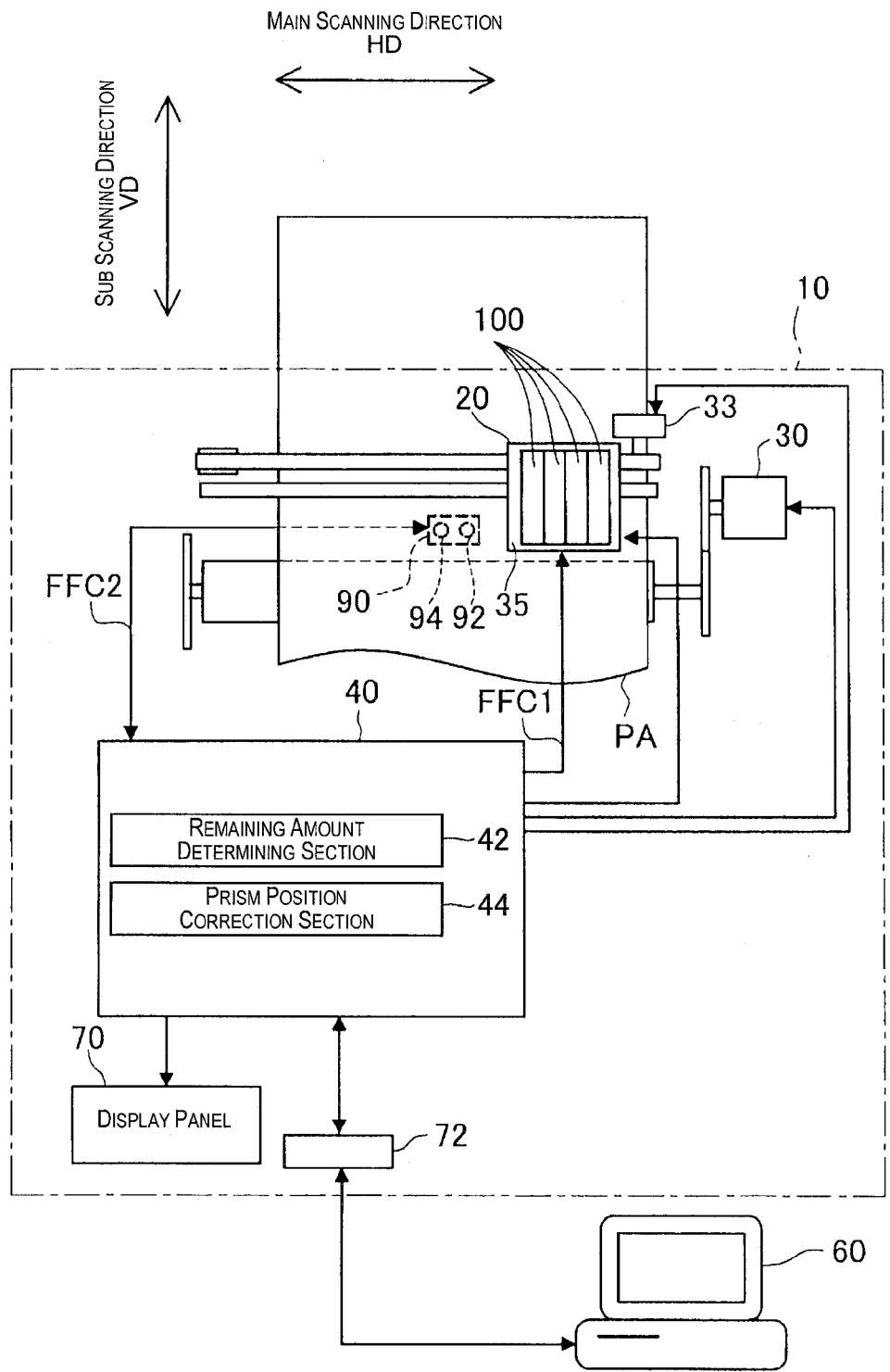
FIG. 2 is a diagram that schematically illustrates a configuration of the printing device.

FIG. 1 is a perspective view of a main part of a printing device 10. FIG. 2 is a diagram that schematically illustrates a configuration of the printing device 10. In FIG. 1, XYZ axes orthogonal to each other are illustrated. In the subsequent drawings, the XYZ axes are also illustrated as needed. According to the present embodiment, in the usage position of the printing device 10, the Z axis direction (Z direction and −Z direction) is a vertical direction, and a plane of the printing device 10 in the X direction is a front plane. The main scanning direction of the printing device 10 is the Y axis direction (Y direction and −Y direction), and the sub scanning direction thereof is the X axis direction (X direction and −X direction).

The printing device 10 has a plurality of ink cartridges 100 as the liquid reservoir section, a holder 20, a paper feed motor 30, a carriage motor 33 as the moving section, a printing head 35, a detecting section 90, and a control unit 40. Ink of one of cyan, magenta, yellow, black, and the like is stored in each of the ink cartridges 100. Each of the ink cartridges 100 is attached to the holder 20. The holder 20 and the printing head 35 are provided in a carriage, and are moved back and forth on a printing medium PA by being driven with the carriage motor 33. The paper feed motor 30 delivers the printing medium PA in the sub scanning direction VD. The carriage motor 33 drives the holder in the main scanning direction HD. The printing head 35 is mounted to the carriage, and ejects ink supplied from each of the ink cartridges 100. Incidentally, in FIG. 1 and FIG. 2, the holder 20 is located in a home position.

Figure 3:
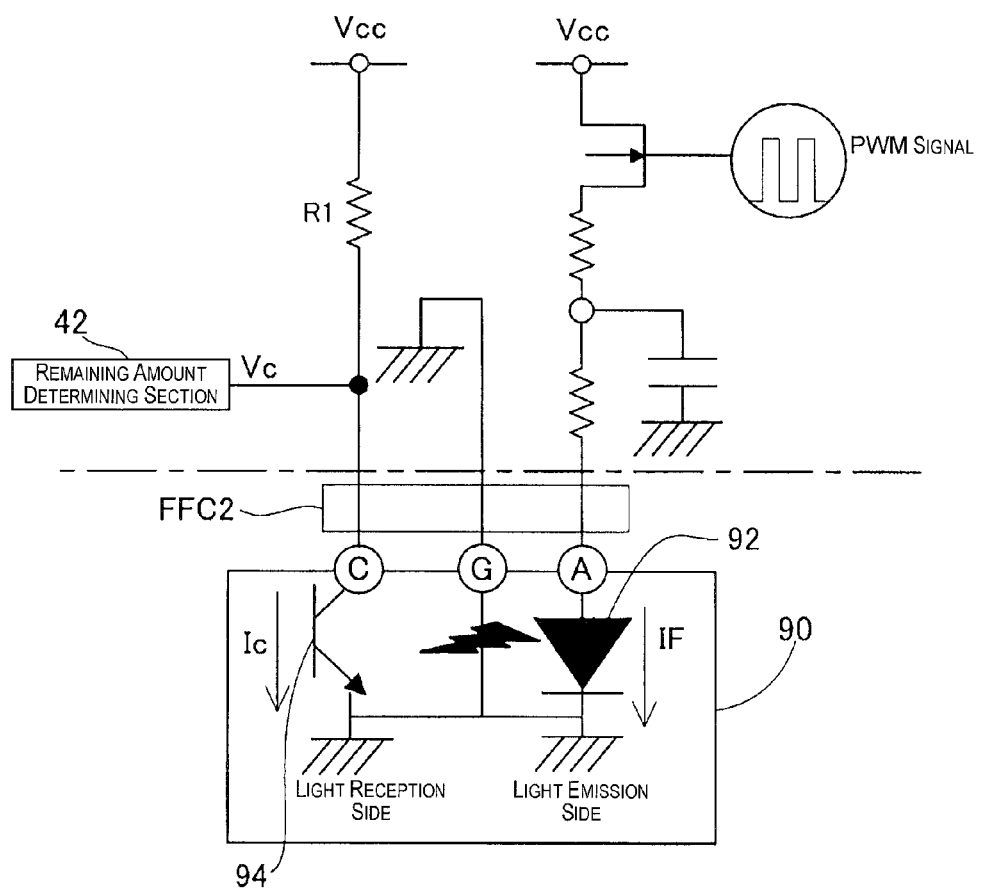
FIG. 3 is a diagram that explains an electrical configuration of a detecting section.

The detecting section 90 is provided in parallel with the main scanning direction HD of the holder 20, and detects a remaining state of ink. The detecting section 90 is configured as a reflection-type photo-interrupter (photo reflector), and has a light emitting section 92 and a light receiving section 94. FIG. 3 is a diagram that explains an electrical configuration of the detecting section 90. The detecting section 90 has an LED (Light Emitting Diode) as the light emitting section 92 and a photo transistor as the light receiving section 94. An emitter terminal of the photo transistor is grounded, and a collector terminal thereof is connected to a power potential Vcc via a resistor R1. A potential between the resistor R1 and the collector terminal is input to a remaining amount determining section 42 (described below) as an output voltage Vc of the detecting section 90. The light emission amount of light emitted from the light emitting section 92 is set by adjusting a duty ratio (ratio of ON time and OFF time) of a PWM (Pulse Width Modulation) signal, applied to the light emitting section 92, by the control unit 40. When light emitted from the light emitting section 92 is reflected on a prism 170 (described below) in the ink cartridge 100 and the reflected light is received by the light receiving section 94, the output voltage Vc corresponding to the light reception amount is input to the remaining amount determining section 42. In the present embodiment, as the light amount received by the light receiving section 94 increases, the output voltage Vc output from the detecting section 90 becomes low.

As shown in FIG. 1 and FIG. 2, the light emitting section 92 and the light receiving section 94 of the detecting section 90 are arranged in parallel with the main scanning direction HD (Y axis direction) in which the holder 20 moves. Also, the light emitting section 92 and the light receiving section 94 are arranged to face the prism 170 in the ink cartridge 100 through an opening section 21 (described below) provided in the holder 20 when the holder 20 is moved by the carriage motor 33 and is located on the detecting section 90.

The control unit 40 has the remaining amount determining section 42 and a prism position correcting section 44. A display panel 70 for displaying an operation state and the like of the printing device 10 is connected to the control unit 40. Also, a computer 60 is connected to the control unit 40 via an interface 72. Further, the carriage is connected to the control unit 40 via a cable FFC1, and the detecting section 90 is connected to the control unit 40 via a cable FFC2. The control unit 40 has a CPU, a ROM, a RAM, and the like (not shown in the drawing). The CPU serves as the remaining amount determining section 42 and the prism position correcting section 44 by decompressing and executing a control program, stored in the ROM in advance, on the RAM. The control unit 40 controls printing to the printing medium PA by controlling the paper feed motor 30, the carriage motor 33, and the printing head 35.

The remaining amount determining section 42 determines a remaining state of ink in the ink cartridge 100 using the prism 170. The remaining amount determining section 42 acquires the output voltage Vc, when the prism 170 of the ink cartridge 100 is located in a predetermined position (detection position) with respect to the detecting section 90, from the detecting section 90 via the cable FFC2. Then, the remaining amount determining section 42 determines whether ink in the ink cartridge 100 becomes equal to or lower than a predetermined amount based on the acquired output voltage Vc and a predetermined threshold value. Hereinafter, a state in which ink becomes equal to or lower than the predetermined amount is referred to as an ink near end state.

The prism position correcting section 44 corrects a relative position (detection position) of the prism 170 of the ink cartridge 100 with respect to the detecting section 90 based on a position of a reflective plate 25 (described below) of the holder 20 that is optically obtained by emitting light to the reflective plate 25.

<Configuration of Ink Cartridge>

Figure 4:
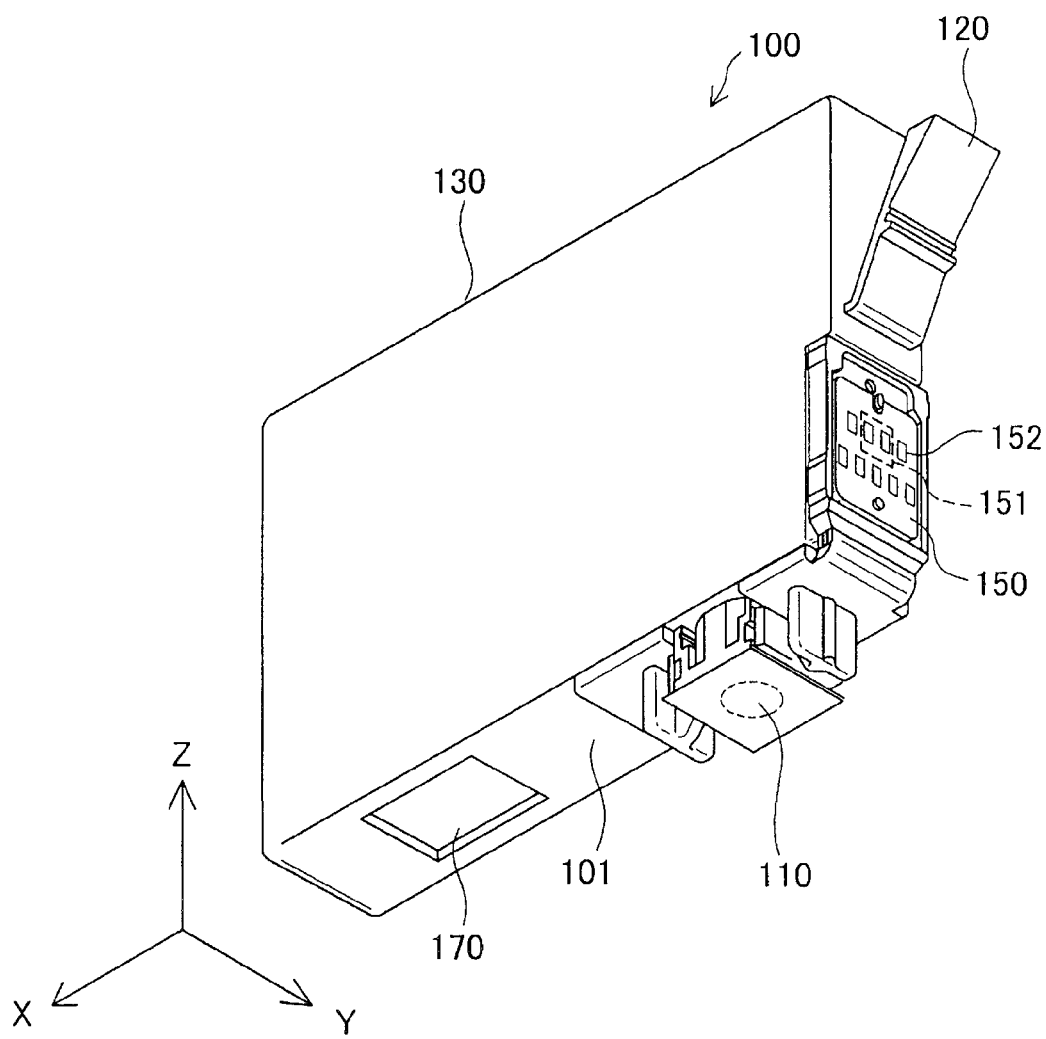
FIG. 4 is a perspective view of an ink cartridge.

FIG. 4 is a perspective view of the ink cartridge 100. The ink cartridge 100 includes an ink storing chamber 130 of a substantially cuboid shape for storing ink in the inside, a circuit board 150, and a lever 120 for attaching the ink cartridge 100 to the holder 20 and removing the ink cartridge 100 from the holder 20. The circuit board 150 is disposed on a side surface on the −X direction side of the ink storing chamber 130 in the −Z direction. The lever 120 is disposed on the side surface on the −X direction side of the ink storing chamber 130 in the +Z direction. The prism 170 is disposed on the bottom surface of the ink storing chamber 130, and has an isosceles right triangular prism shape. The bottom surface of the prism 170 is exposed from a bottom surface 101 of the ink cartridge 100, that is a side surface on the −Z direction side. An ink supply port 110 is formed in the bottom surface 101 of the ink cartridge 100, and an ink feed receiving needle (not shown in the drawing) provided in the holder 20 is inserted into the ink supply port 110 when the ink cartridge 100 is attached to the holder 20. The ink supply port 110 is sealed with a film in a state before the ink cartridge 100 is used. When the ink cartridge 100 is attached to the holder 20 from above, the film is broken by the ink feed receiving needle, and ink is supplied from the ink storing chamber 130 to the printing head 35 through the ink supply port 110.

A memory device 151 for storing information regarding the ink cartridge 100 is installed on a back surface of the circuit board 150. A plurality of terminals 152 are provided on a front surface of the circuit board 150, and the plurality of terminals 152 are electrically connected with the memory device 151. When the ink cartridge 100 is attached to the holder 20, the plurality of terminals 152 electrically contacts a plurality of terminals on a main body side which are provided in the holder 20 (the plurality of terminals on a main body side are not shown in the drawing). With this configuration, when the ink cartridge 100 is attached to the holder 20, the control unit 40 is electrically connected with the memory device 151, and reading and writing of data become possible with respect to the memory device 151. As the memory device 151, a non-volatile memory such as an EEPROM or the like can be used.

<Configuration of Holder>

Figure 5A:
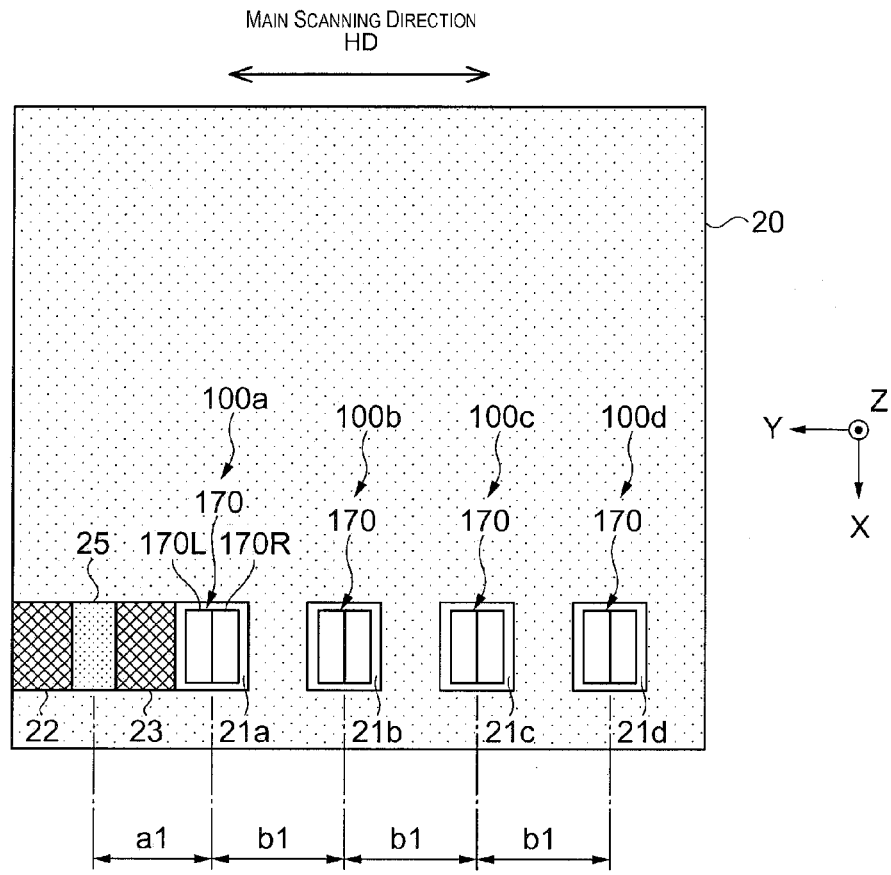
FIGS. 5A and 5B are diagrams that explain a configuration of a holder.
Figure 5B:
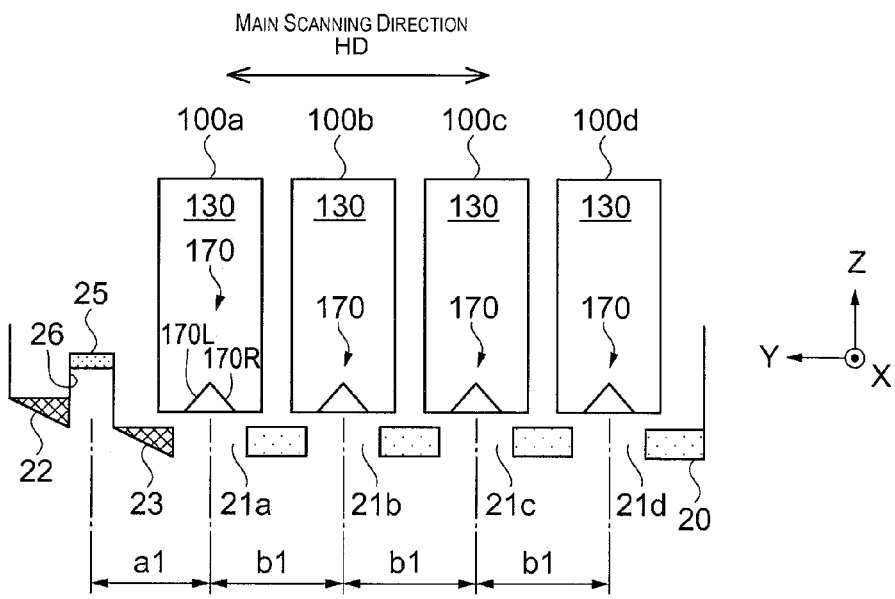

FIGS. 5A and 5B are diagrams that explain a configuration of the holder 20. FIG. 5A is a schematic diagram of the bottom surface of the holder 20 viewed from the detecting section 90 side. FIG. 5B is a schematic diagram of the YZ cross-section of the holder 20 and the ink cartridge 100 attached to the holder 20. As shown in FIG. 5A and FIG. 5B, four opening sections 21a-21d are provided in the bottom surface of the holder 20. Also, four ink cartridges 100a-100d are attached to the holder 20 in positions that correspond to the opening sections 21a-21d, respectively. Each prism 170 is provided in each ink storing chamber 130 of the ink cartridges 100a-100d. Each prism 170 is a transparent member having an isosceles right triangular prism shape in which an apex angle is formed by an inclined surface 170L and an inclined surface 170R, and is made of polypropylene, for example. A state of reflected light of light entering each prism 170 from the light emitting section 92 is different depending on the refractive index of fluid (ink or air) that contacts the inclined surface 170L and the inclined surface 170R, respectively. The opening sections 21a-21d are provided in positions to face the light emitting section 92 and the light receiving section 94 of the detecting section 90 when each prism 170 of the ink cartridges 100a -100d is located right above the detecting section 90 by moving the holder 20 back and forth.

A recessed portion 26 is formed in the bottom surface of the holder 20 near an end portion thereof on the Y direction side. The reflective plate 25 as the reflective region is provided on the bottom surface of the recessed portion 26. The reflective plate 25 is provided in a position to face the light emitting section 92 and the light receiving section 94 when the reflective plate 25 is located right above the detecting section 90 by moving the holder 20 back and forth. The reflective plate 25 is made of a mirror that can totally reflect entering light. When light emitted from the light emitting section 92 enters the reflective plate 25 in a state where the reflective plate 25 is located right above the detecting section 90, reflected light that is totally reflected on the reflective plate 25 enters the light receiving section 94. Incidentally, instead of providing the reflective plate 25, a reflective material may be coated on the bottom surface of the recessed portion 26 of the holder 20 so as to serve as the reflective plate 25.

A non-reflective member 22 and a non-reflective member 23 as the non-reflective region are provided at both ends of the recessed portion 26 in the main scanning direction HD (Y axis direction), that is, at both ends of the reflective plate 25 in the main scanning direction HD in a case where the reflective plate 25 is viewed from the detecting section 90 side. The non-reflective member 22 and the non-reflective member 23 are made of a material that absorbs light, and bottom surfaces viewed from the detecting section 90 side are inclined with respect to the main scanning direction HD, respectively. In the present embodiment, the non-reflective member 22 and the non-reflective member 23 are made of polystyrene colored with a black color, and the bottom surfaces are inclined with respect to the main scanning direction HD at an angle of 45 degrees, respectively. However, the material of the non-reflective member 22 and the non-reflective member 23, and the inclination angle of each of the bottom surfaces are not limited to the above. Any material and any inclination angle may be applied as long as they can prevent reflected light on the non-reflective member 22 and the non-reflective member 23 from entering the light receiving section 94. Also, the non-reflective member 22 and the non-reflective member 23 are formed integrally with the holder 20 using the same material.

As shown in FIG. 5A and FIG. 5B, the center position of the opening section 21a is spaced apart from the center position of the reflective plate 25 at a distance a1 in the main scanning direction HD. Also, the center position of the adjacent opening section 21b is spaced apart from the center position of the opening section 21a at a distance b1. Likewise, the center position of the adjacent opening section 21c is spaced apart from the center position of the opening section 21b at the distance b1, and the center position of the adjacent opening section 21d is spaced apart from the center position of the opening section 21c at the distance b1.

Figure 6:
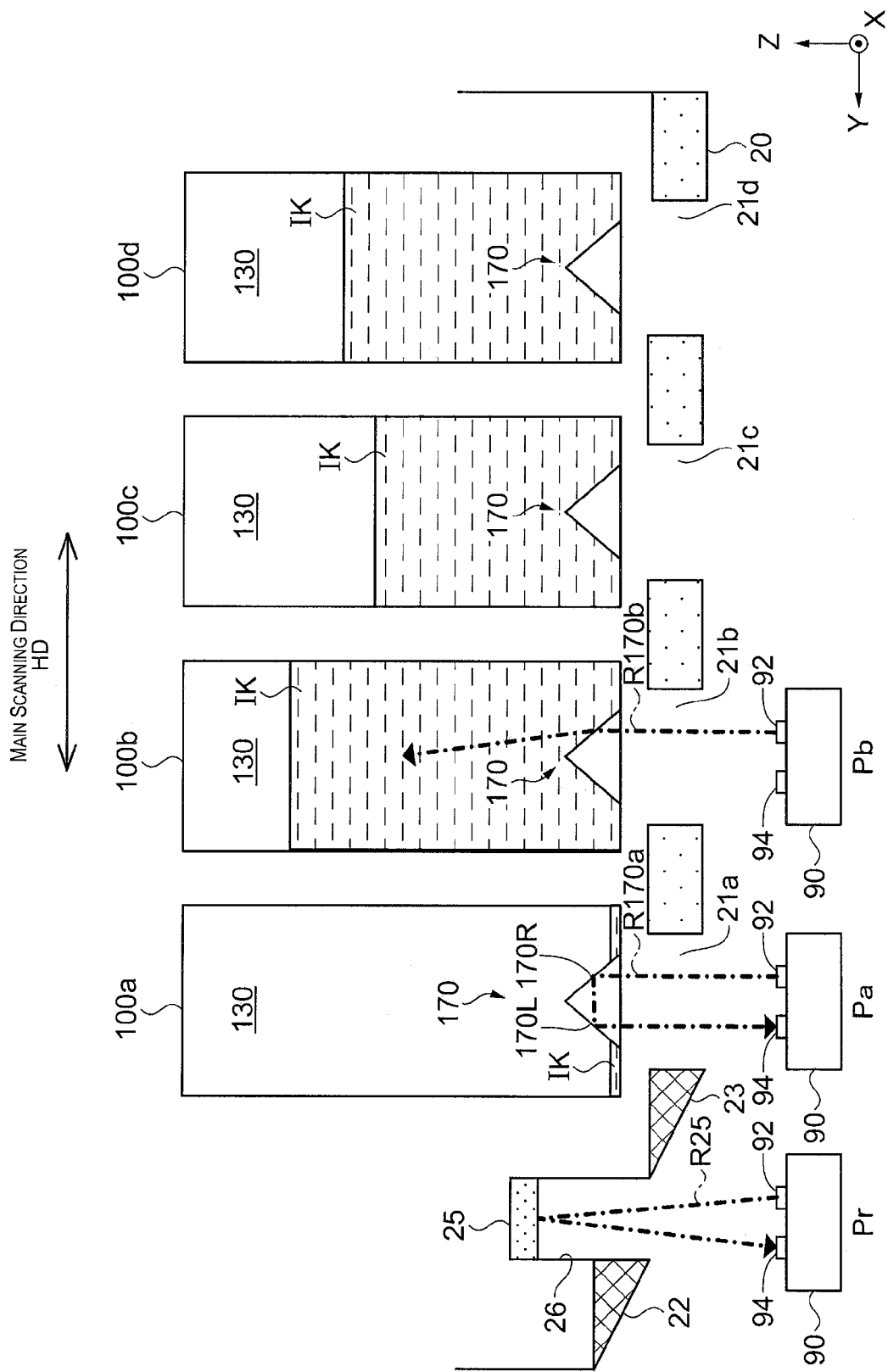
FIG. 6 is a diagram that explains a state of reflected light when light is emitted from a light emitting section.

FIG. 6 is a diagram that explains a state of reflected light when light is emitted from the light emitting section 92. The holder 20 shown in FIG. 6 moves back and forth in the main scanning direction HD on the detecting section 90 fixed to the printing device 10 by being driven with the carriage motor 33 described above. When the holder 20 moves on the detecting section 90, the positional relationship between the holder 20 and the detecting section 90 relatively changes as examples of a position Pr, a position Pa, and a position Pb shown in FIG. 6.

In the position Pr, the detecting section 90 faces the reflective plate 25 that is provided on the bottom surface of the recessed portion 26. Here, the reflective plate 25 is located right above the detecting section 90. The center position between the light emitting section 92 and the light receiving section 94 substantially coincides with the center position of the reflective plate 25 in the main scanning direction HD. When the reflective plate 25 is located right above the detecting section 90, light R25 emitted from the light emitting section 92 toward the reflective plate 25 is totally reflected on the reflective plate 25 because the reflective plate 25 is formed of a mirror, and the reflected light is received by the light receiving section 94.

In the position Pa, the detecting section 90 faces the prism 170 of the ink cartridge 100a. Here, the center position between the light emitting section 92 and the light receiving section 94 substantially coincides with the apex angle of the prism 170. In the ink cartridge 100a, since ink IK has been consumed, most of the inclined surfaces 170L and 170R of the prism 170 are exposed from the ink IK, and the inclined surfaces 170L and 170R contact air. Therefore, when light R170a emitted from the light emitting section 92 toward the prism 170 enters the inside of the prism 170 through the bottom surface of the prism 170, the light R170a is totally reflected on the inclined surfaces 170L and 170R, respectively, due to the difference in the refractive index between the prism 170 and air. As a result, the traveling direction of the reflected light of the light R170a emitted from the light emitting section 92 is inverted by 180 degrees. Then, the reflected light exits from the bottom surface of the prism 170 to the outside, and is received by the light receiving section 94. Also, part of the light R170a emitted from the light emitting section 92 is reflected on the bottom surface of the prism 170, and the reflected light is received by the light receiving section 94. However, the light amount of this reflected light is slight compared to the reflected light from the inclined surfaces 170L and 170R.

In the position Pb, the detecting section 90 faces the prism 170 of the ink cartridge 100b. Here, similarly to the position Pa, the center position between the light emitting section 92 and the light receiving section 94 substantially coincides with the apex angle of the prism 170 in the main scanning direction HD. In the ink cartridge 100b, however, ink IK remains in a position higher than the inclined surfaces 170L and 170R of the prism 170. Therefore, most of light R170b emitted from the light emitting section 92 toward the prism 170 transmit the inclined surface 170R and are absorbed in the ink IK because the refractive index is similar in the prism 170 and the ink IK. Also, similarly to the position Pa, part of the light R170b emitted from the light emitting section 92 is reflected on the bottom surface of the prism 170, and the reflected light is received by the light receiving section 94. However, the light amount of this reflected light is slight.

<Ink Near End State Detection Process>

Next, an explanation will be made on a process of determining whether ink in the ink cartridge 100 is in an ink near end state or not.

Figure 7:
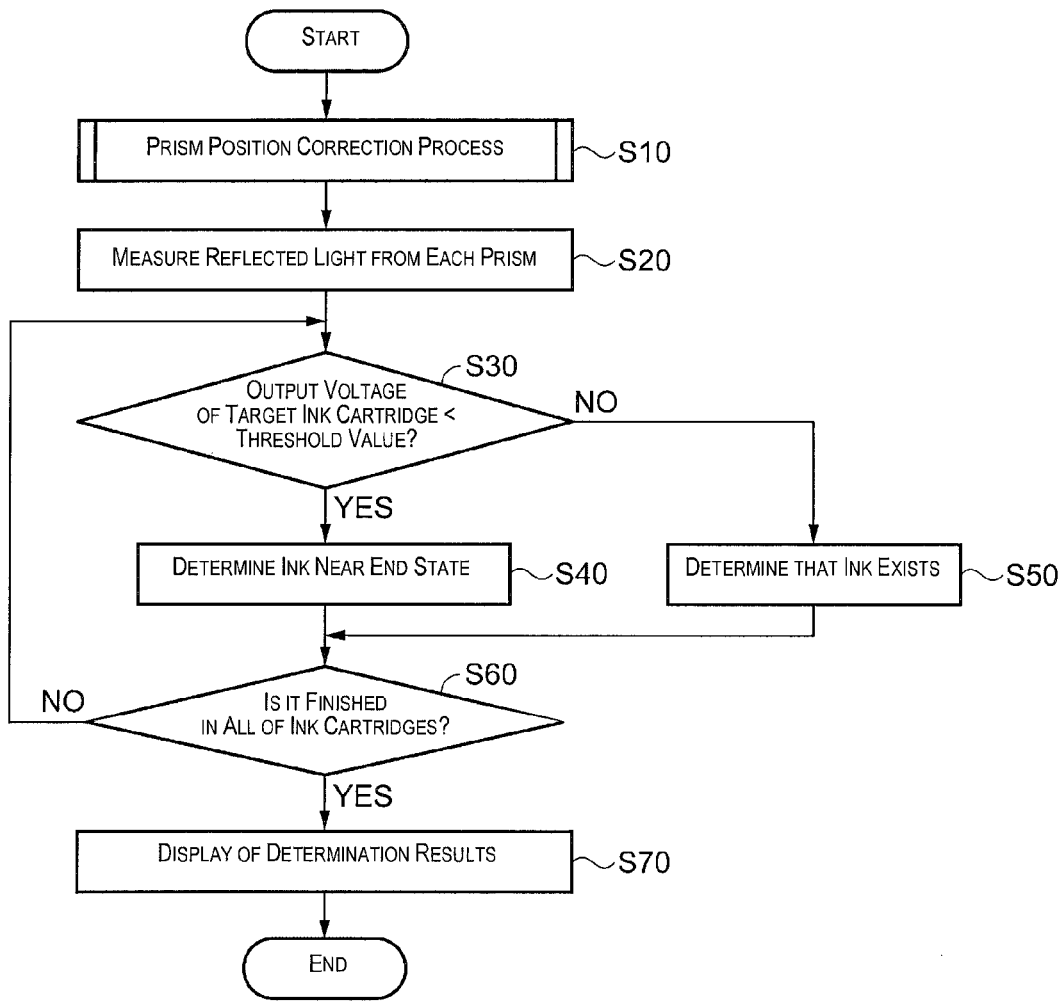
FIG. 7 is a flow chart of an ink near end detection process.

FIG. 7 is a flow chart of the ink near end detection process. This ink near end state detection process is conducted at various timings such as a timing when the printing device 10 is started, or a timing when the ink cartridge 100 is replaced.

First, the control unit 40 conducts a position correction process in the main scanning direction HD with respect to each prism 170 of the ink cartridges 100a-100d (step S10).

The details of the position correction process of each prism 170 will be described.

Figure 8:
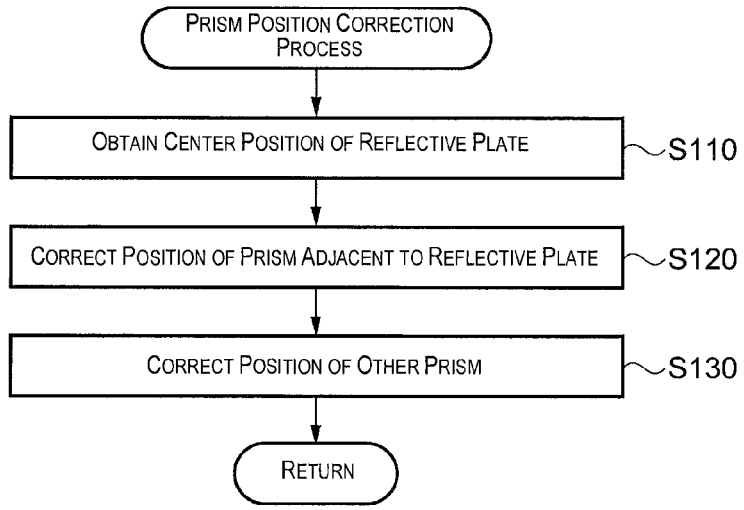
FIG. 8 is a flow chart of the details of a position correction process of a prism.
Figure 9:
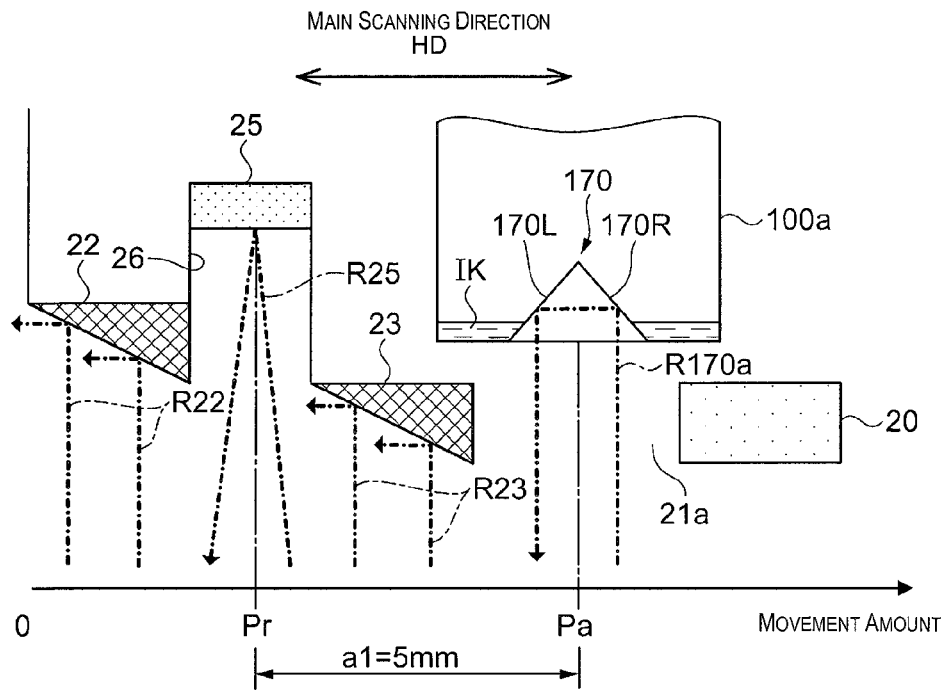
FIG. 9 is a diagram that explains a state of reflected light of light emitted from the light emitting section with respect to a reflective plate and the ink cartridge.
Figure 10:
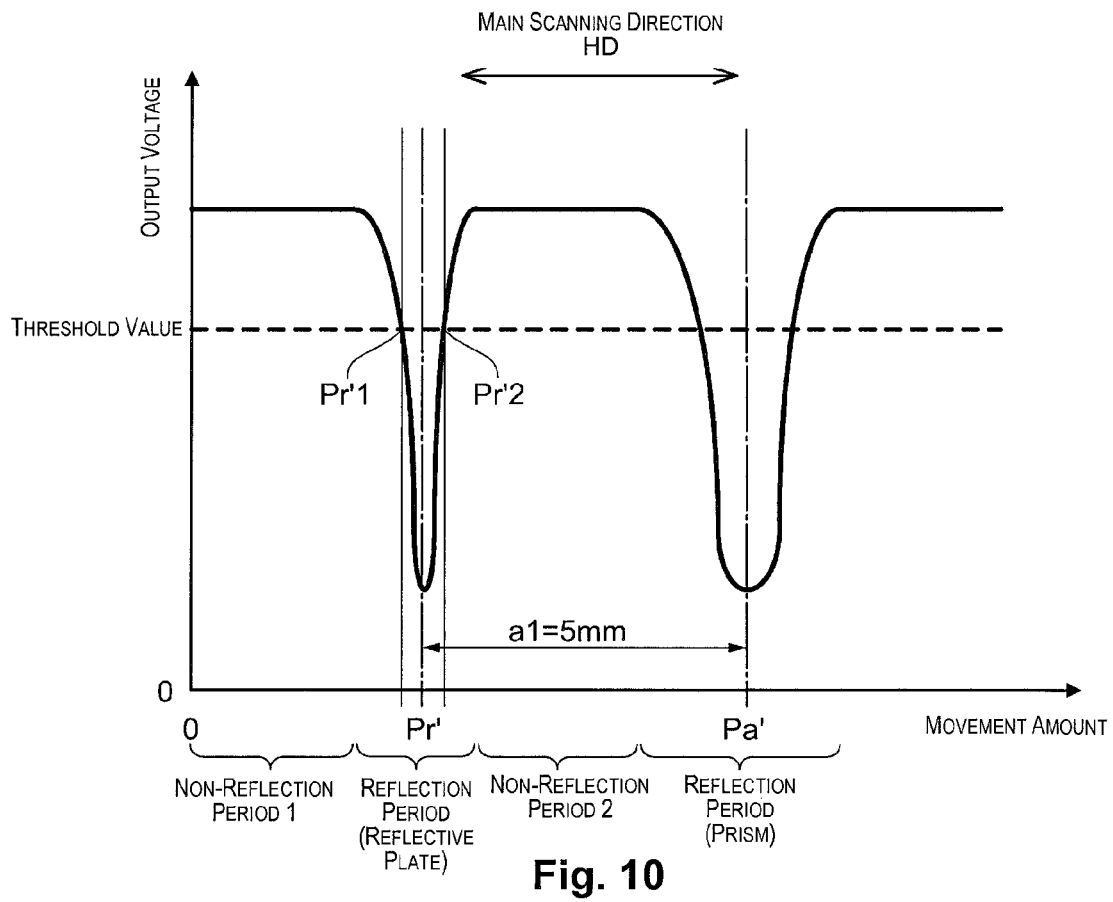
FIG. 10 is a diagram that shows measurement results of an output voltage from the detecting section in a state of each reflected light.

FIG. 8 is a flow chart of the details of a position correction process of each prism 170. FIG. 9 is a diagram that explains a state of reflected light of light emitted from the light emitting section 92 with respect to the reflective plate 25 and the ink cartridge 100a. FIG. 10 is a diagram that shows measurement results of an output voltage from the detecting section 90 in a state of each reflected light of FIG. 9.

First, an explanation will be made on FIG. 9 and FIG. 10. The horizontal axes of FIG. 9 and FIG. 10 represent a movement amount of the holder 20 in the main scanning direction HD from the home position. The vertical axis of FIG. 10 represents the output voltage from the detecting section 90. Here, as described above, the output voltage from the detecting section 90 becomes low as the light amount received by the light receiving section 94 increases. Incidentally, in FIG. 9, the detecting section 90 provided with the light emitting section 92 and the light receiving section 94 is not shown in the drawing, and only light emitted from the light emitting section 92 and reflected light are shown in the drawing.

As shown in FIG. 9, when the holder 20 moves from the home position in the main scanning direction HD, the detecting position 90 first faces the non-reflective member 22 of the holder 20, and light R22 is emitted from the light emitting section 92 toward the non-reflective member 22. Then, part of the light R22 emitted from the light emitting section 92 is absorbed by the non-reflective member 22, and the light R22 that has not been absorbed is reflected on the inclined surface of the non-reflective member 22 in a direction different from a direction of entering the light receiving section 94. In FIG. 10, a period in which the detecting position 90 faces the non-reflective member 22 corresponds to a "non-reflection period 1". In the "non-reflection period 1", since the light amount received by the light receiving section 94 decreases, the output voltage from the detecting section 90 maintains a constantly high state.

Subsequently, when the holder 20 further moves in the main scanning direction HD, the detecting position 90 faces the reflective plate 25 of the holder 20, and the light R25 is emitted from the light emitting section 92 toward the reflective plate 25. Then, the light R25 emitted from the light emitting section 92 is totally reflected on the reflective plate 25, and the reflected light is received by the light receiving section 94. FIG. 9 shows an example of emission of the light R25 in the position Pr in which the center position between the light emitting section 92 and the light receiving section 94 substantially coincides with the center position of the reflective plate 25. In FIG. 10, a period in which the detecting position 90 faces the reflective plate 25 corresponds to a "reflection period (reflective plate)". In the "reflection period (reflective plate)", the light amount received by the light receiving section 94 gradually increases, and then gradually decreases after reaching a maximum light amount. Therefore, the output voltage from the detecting section 90 gradually decreases from a previous high state, and then gradually increases after reaching a minimum voltage so as to return to the previous high voltage.

Subsequently, when the holder 20 further moves in the main scanning direction HD, the detecting position 90 faces the non-reflective member 23 of the holder 20, and light R23 is emitted from the light emitting section 92 toward the non-reflective member 23. Then, similarly to the case of the non-reflective member 22, part of the light R23 emitted from the light emitting section 92 is absorbed by the non-reflective member 23, and the light R23 that has not been absorbed is reflected on the inclined surface of the non-reflective member 23 in a direction different from a direction of entering the light receiving section 94. In FIG. 10, a period in which the detecting position 90 faces the non-reflective member 23 corresponds to a "non-reflection period 2". In the "non-reflection period 2", since the light amount received by the light receiving section 94 decreases, the output voltage from the detecting section 90 maintains a constantly high state.

Subsequently, when the holder 20 further moves in the main scanning direction HD, the detecting position 90 faces the prism 170 of the ink cartridge 100a, and the light R170a is emitted from the light emitting section 92 toward the prism 170. Then, the light R170a emitted from the light emitting section 92 is totally reflected on the inclined surfaces 170L and 170R of the prism 170, and the reflected light is received by the light receiving section 94. FIG. 9 shows an example of emission of the light R170a in the position Pa in which the center position between the light emitting section 92 and the light receiving section 94 substantially coincides with the center position of the prism 170, that is, the apex angle of the prism 170. In FIG. 10, a period in which the detecting position 90 faces the prism 170 corresponds to a "reflection period (prism)". In the "reflection period (prism)", the light amount received by the light receiving section 94 gradually increases, and then gradually decreases after reaching a maximum light amount. Therefore, the output voltage from the detecting section 90 gradually decreases from a previous high state, and then gradually increases after reaching a minimum voltage so as to return to the previous high voltage.

Next, the position correction process of the prism shown in the flow chart of FIG. 8 will be described. First, the control unit 40 causes the light emitting section 92 to emit light, and thereafter causes the holder 20 to move in the main scanning direction HD such that the reflective plate 25 of the holder 20 passes over the detecting section 90. Then, based on reflected light from the reflective plate 25 when the reflective plate 25 passes over the detecting section 90, the center position of the reflective plate 25 in the main scanning direction HD is obtained (step S110). In the examples of FIG. 9 and FIG. 10, the control unit 40 obtains the center position of the reflective plate 25 based on the displacement of the output voltage in "non-reflection period 1"→"reflection period (reflective plate)"→"non-reflection period 2" shown in FIG. 10. More specifically, first, the control unit 40 sets a threshold value of the output voltage for the reflective plate 25. Then, the control unit 40 considers the intersection point between the threshold value and the gradually decreasing output voltage as one optical end section Pr'1 with respect to the reflective plate 25, and considers the intersection point between the threshold value and the gradually increasing output voltage as the other optical end section Pr'2 with respect to the reflective plate 25. Then, the control unit 40 considers the center position between the optical end section Pr'1 and the optical end section Pr'2 as a center position Pr' of the reflective plate 25. Specifically, an optical position corresponding to the center position Pr of the reflective plate 25 shown in FIG. 9 is obtained as the center position Pr' of the reflective plate 25 shown in FIG. 10 based on the output voltage from the detecting section 90.

In FIG. 10, comparing the curve of the output voltage in the "reflection period (reflective plate)" and the curve of the output voltage in the "reflection period (prism)", the curve in the "reflection period (reflective plate)" is steeper than the curve in the "reflection period (prism)". This is because noise light is controlled by the non-reflective members 22 and 23 provided at both ends of the reflective plate 25 in the "reflection period (reflective plate)". Accordingly, the center position Pr' of the reflective plate 25 can be obtained with higher accuracy by providing the non-reflective members 22 and 23.

Next, based on the center position of the reflective plate 25 obtained in the step S110, the control unit 40 corrects the position of the prism 170 of the ink cartridge 100a adjacent to the reflective plate 25 in the main scanning direction HD (step S120). In the examples of FIG. 9 and FIG. 10, based on the obtained center position Pr' of the reflective plate 25, the control unit 40 obtains a center position Pa' of the prism 170 of the ink cartridge 100a. and corrects the center position Pa' in a case where there is position displacement with respect to the center position Pa that is the reference of measurement by the detecting section 90. More specifically, based on the obtained center position Pr' of the reflective plate 25, the control unit 40 first obtains the center position Pa' of the prism 170 of the ink cartridge 100a. In the present embodiment, the distance a1 from the center position Pr of the reflective plate 25 to the center position Pa of the prism 170 of the ink cartridge 100a shown in FIG. 9 is set to 5 mm. Accordingly, the position Pa' spaced apart from the center position Pr' of the reflective plate 25 shown in FIG. 10 by 5 mm is obtained as the center position Pa' of the prism 170. Then, in a case where the obtained center position Pa' of the prism 170 is different from the center position Pa of the prism 170 that is the reference shown in FIG. 9, the center position of the prism 170 used for measurement by the detecting section 90 is corrected to be the center position Pa'.

Next, the control unit 40 corrects the position of the prisms 170 of the other ink cartridges 100b-100d in the main scanning direction HD similarly to the prism 170 of the ink cartridge 100a based on the fact that the intervals of the adjacent openings 21a, 21b, 21c, and 21d are the distance b1, respectively (step S130).

As shown in the flow chart of FIG. 7, the control unit 40 causes the holder 20 to move in the main scanning direction HD such that the prisms 170 of the ink cartridges 100a-100d pass over the detecting section 90, respectively. Then, the control unit 40 causes the detecting section 90 to measure the output voltage that corresponds to the light amount of the reflected light from each prism 170, and acquires the measurement results (step S20). Here, the detecting section 90 measures the output voltage based on the position (detection position) of each prism 170 corrected in step S10.

Next, in order to sequentially determine whether it is in an ink near end state with respect to the ink cartridges 100a-100d, the control unit 40 compares the output voltage of the ink cartridge 100 that is the target of the determination and a threshold value of the output voltage for ink near end state determination based on the measurement results of the output voltage in step S20 (step S30). In a case where the output voltage of the ink cartridge 100 that is the target of the determination is smaller than the threshold value (step S30: YES), it is determined that the ink cartridge 100 that is the target of the determination is in the "ink near end state" (step S40). On the other hand, in a case where the output voltage of the ink cartridge 100 that is the target of the determination is not smaller than the threshold value (step S30: NO), it is determined that "ink exists" in the ink cartridge 100 that is the target of the determination (step S50).

Next, the control unit 40 determines whether determination of an ink near end state is finished in all of the ink cartridges 100a-100d (step S60). In a case where determination of an ink near end state is finished in all of the ink cartridges 100a-100d (step S60: YES), the control unit 40 displays the remaining state (whether or not it is in an ink near end state) in the ink cartridges 100a-100d on the display panel 70 provided in the printing device 10 or the computer 60 connected to the printing device 10 (step S70). On the other hand, in a case where there is an ink cartridge among the ink cartridges 100a-100d in which determination of an ink near end state is not finished (step S60: NO), the process is returned to step S30, and determination of an ink near end state is conducted to the ink cartridge 100 in which determination of an ink near end state is not finished.

As described above, in the present embodiment, the opening sections 21a-21d are provided in the bottom surface of the holder 20, and the reflective plate 25 is provided in a position spaced apart from the opening section 21a by a predetermined distance. Also, the non-reflective member 22 and non-reflective member 23 are provided at both ends of the reflective plate 25. The optical position of the reflective plate 25 is obtained based on light that is emitted from the detecting section 90 and is totally reflected on the reflective plate 25 when the reflective plate 25 passes over the detecting section 90, and the position correction is conducted by specifying the position of each prism 170 of the ink cartridges 100a-100d based on the optical position of the reflective plate 25. In this manner, the optical position of the reflective plate 25 is obtained by the reflected light of light emitted from the detecting section 90, and the position of each prism 170 is corrected based on the obtained optical position of the reflective plate 25. Therefore, even in a case where an error occurs in the attachment position of the detecting section 90 or the holder 20 in the printing device 10, for example, determination of an ink near end state can be conducted based on reflected light from each prism 170 received in a correct position. Consequently, determination of an ink near end state can be conducted with high accuracy with respect to each of the ink cartridges 100a-100d. Also, since the reflective plate 25 for specifying the position of each prism 170 is provided in the holder 20, not in the ink cartridges 100a-100d, the cost of the ink cartridge can be reduced compared to a conventional technique in which a reflective member is provided in each ink cartridge.

(First Modified Example of First Embodiment)

Hereinafter, a first modified example of the first embodiment will be described.

Figure 11A:
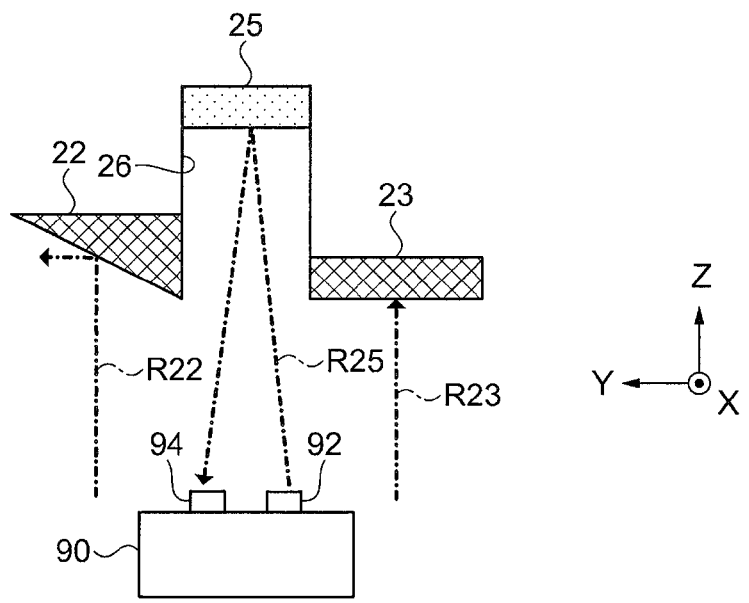
FIGS. 11A and 11B are diagrams of a configuration of the vicinity of the reflective plate provided in the holder according to a first modified example of a first embodiment (with a recessed portion).
Figure 11B:
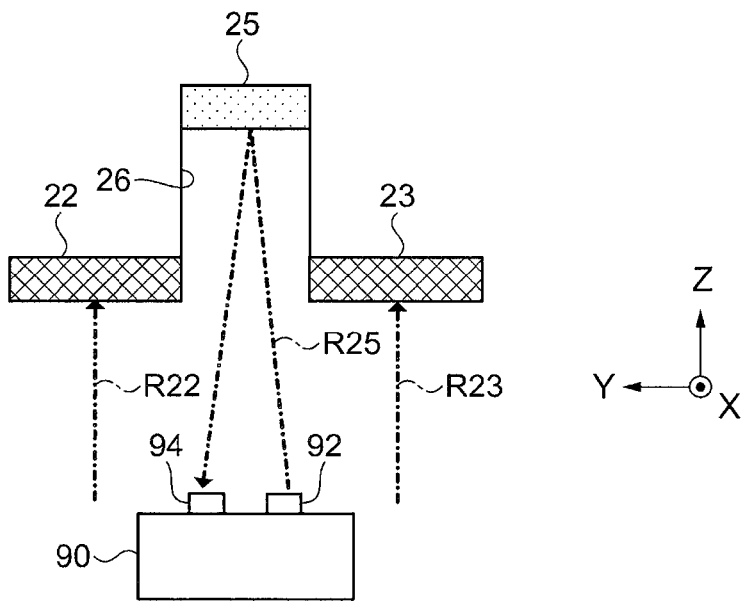
Figure 12A:
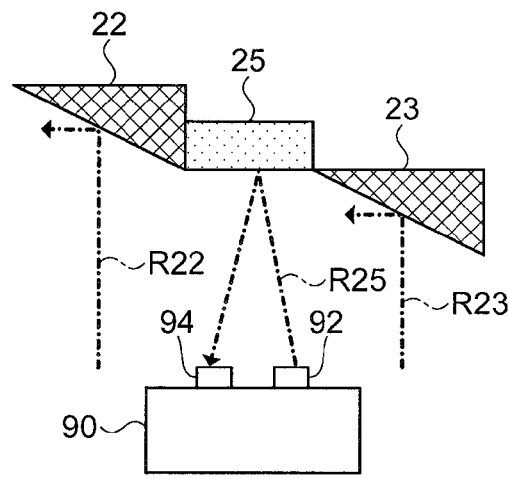
FIGS. 12A-12C are diagrams of a configuration of the vicinity of the reflective plate provided in the holder according to the first modified example of the first embodiment (without a recessed portion).
Figure 12B:
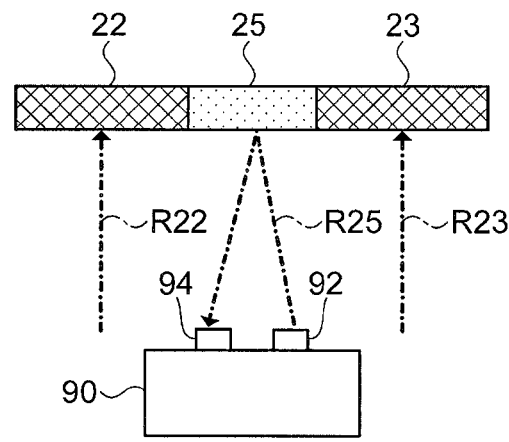
Figure 12C:
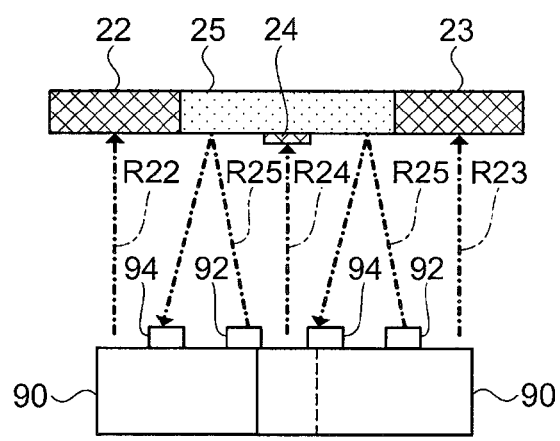

In the first modified example of the first embodiment, the configuration in the vicinity of the reflective plate 25 provided in the holder 20 is different. FIGS. 11A and 11B are diagrams of the configuration of the vicinity of the reflective plate 25 provided in the holder 20 according to the first modified example of the first embodiment (with the recessed portion 26). FIGS. 12A-12C are diagrams of the configuration of the vicinity of the reflective plate 25 provided in the holder 20 according to the first modified example of the first embodiment (without the recessed portion 26).

In FIG. 11A and FIG. 11B, the reflective plate 25 is provided on the bottom surface of the recessed portion 26, and the non-reflective members 22 and 23 are provided at both ends of the reflective plate 25 in the main scanning direction HD (Y axis direction). In FIG. 11A, the bottom surface of the non-reflective member 22 is inclined with respect to the main scanning direction HD. On the other hand, the bottom surface of the non-reflective member 23 is substantially in parallel with the main scanning direction HD. However, the bottom surface of the non-reflective member 22 may be substantially in parallel with the main scanning direction HD, and the bottom surface of the non-reflective member 23 may be inclined with respect to the main scanning direction HD. In FIG. 11B, both of the bottom surface of the non-reflective member 22 and the bottom surface of the non-reflective member 23 are substantially in parallel with the main scanning direction HD.

In FIG. 12A to FIG. 12C, the reflective plate 25 is provided on the bottom surface of the holder 20, not on the bottom surface of the recessed portion 26, and the non-reflective members 22 and 23 are provided at both ends of the reflective plate 25 in the main scanning direction HD (Y axis direction). In FIG. 12A, both of the bottom surface of the non-reflective member 22 and the bottom surface of the non-reflective member 23 are inclined with respect to the main scanning direction HD. In FIG. 12B, both of the bottom surface of the non-reflective member 22 and the bottom surface of the non-reflective member 23 are substantially in parallel with the main scanning direction HD. In FIG. 12C, a non-reflective member 24 is provided in the center of a side surface on the −Z side of the reflective plate 25 in the main scanning direction HD.

The inclination of the non-reflective members 22 and 23 is not limited to the main scanning direction. For example, the non-reflective members 22 and 23 may be inclined in the sub scanning direction, or may be inclined in both of the main scanning direction and the sub scanning direction. Further, the inclination of the non-reflective members 22 and 23 is not limited to inclination with respect to the main scanning direction and the sub scanning direction, and the non-reflective members 22 and 23 may be inclined with respect to the bottom surface of the prism 170.

The configurations of the vicinity of the reflective plate 25 as shown in FIG. 11A, FIG. 11B, and FIG. 12A to FIG. 12C are only examples, and the present invention is not limited to these. For example, various variations are possible for the number and the location of the reflective plate 25, the number, the location and the inclination of the non-reflective member, and the like, in response to the type, the usage environment, the configuration, and the like of the printing device 10, and the location, the light emitting capacity, the light receiving capacity, and the like of the detecting section 90. For example, a combination of the reflective plate 25 and the non-reflective member may be provided in a plurality of areas of the holder 20, and the optical position of the reflective plate 25 may be obtained in each area, so as to correct the position of each prism 170 with higher accuracy. Also, instead of providing the non-reflective members at both ends of the reflective plate 25, the periphery of the reflective plate 25 may be surrounded by the non-reflective member, or the non-reflective member may be provided at one end of the reflective plate 25, for example. Also, instead of providing the non-reflective members in the holder 20, a non-reflective material may be coated on the bottom surface of the holder 20.

(Second Modified Example of First Embodiment)

Hereinafter, a second modified example of the first embodiment will be described.

Figure 13A:
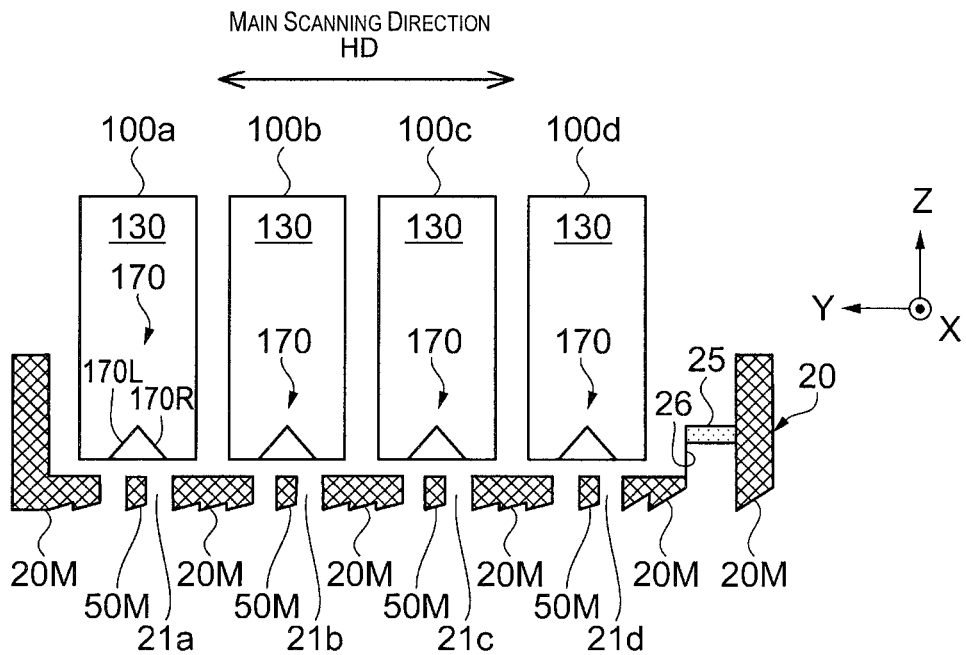
FIG. 13A and 13B are diagrams that explain a configuration of the holder according to a second modified example of the first embodiment.
Figure 13B:
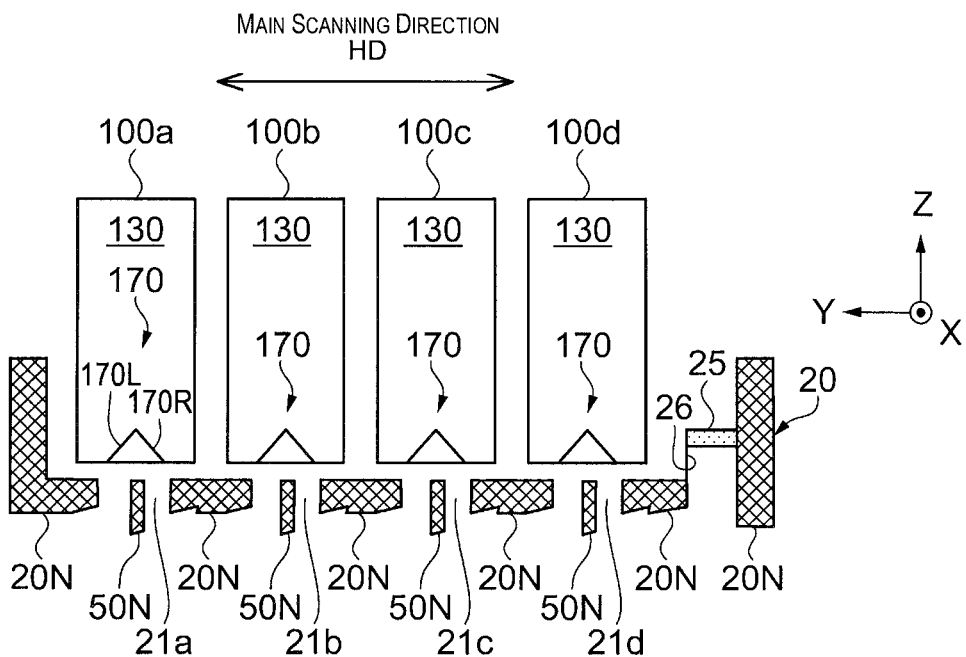

FIGS. 13A and 13B are schematic diagrams of the YZ cross-section of the holder 20 and the ink cartridge 100 attached to the holder 20 according to the second modified example of the first embodiment. In FIG. 13A, each light shielding mask 50M is provided in a substantially central position of each of the opening sections 21a-21d in the bottom surface of the holder 20 so as to cover part of the bottom surface of each prism 170. In FIG. 13B, each light shielding mask 50N is provided in a substantially central position of each of the opening sections 21a-21d in the bottom surface of the holder 20 so as to cover part of the bottom surface of each prism 170. Each light shielding mask 50M and each light shielding mask 50N divide each of the opening sections 21a-21d in a direction parallel to the ridge line of each prism 170. Further, the bottom surfaces of each light shielding mask 50M and each light shielding mask 50N are inclined with respect to the main scanning direction HD. The inclination is configured such that light entering the light shielding mask 50M and the light shielding mask 50N from the light emitting section 92 is hard to enter the light receiving section 94. Specifically, the inclination of the light shielding mask 50M and the light shielding mask 50N is configured such that the distance from the light emitting section 92 to the light shielding mask in the Z direction is longer than the distance from the light receiving section 92 to the light shielding mask in the Z direction. However, the inclination of the bottom surfaces of the light shielding mask 50M and the light shielding mask 50N is not limited to the main scanning direction HD.

Further, in FIG. 13A, the bottom surface of the holder 20 is constructed of a non-reflective member 20M. In FIG. 13B, the bottom surface of the holder 20 is constructed by a non-reflective member 20N. Each bottom surface of the non-reflective members 20M and 20N is formed of a large number of inclined surfaces which are inclined with respect to the main scanning direction HD. The inclination is configured such that light entering the non-reflective members 20M and 20N from the light emitting section 92 is hard to enter the light receiving section 94. Specifically, the inclination of the non-reflective members 20M and 20N is configured such that the distance from the light emitting section 92 to the non-reflective members 20M and 20N in the Z direction is longer than the distance from the light receiving section 94 to the non-reflective members 20M and 20N in the Z direction. However, the inclination of the bottom surfaces of the non-reflective members 20M and 20N is not limited to the main scanning direction HD.

The shape of the light shielding mask and the shape of the inclined surface of the non-reflective member are different between the light shielding mask 50M and the non-reflective member 20M in FIG. 13A, and the light shielding mask 50N and the non-reflective member 20N in FIG. 13B. Also, the light shielding masks 50M and 50N, and the non-reflective members 20M and 20N are made of a material that absorbs light, and are formed integrally with the holder 20 using the same material.

The light shielding masks 50M and 50N are effective in preventing light emitted from the light emitting section 92 from being reflected on the bottom surface of the prism 170 and preventing noise light from entering the light receiving section 94. As described above, since the light shielding masks 50M and 50N are made of a material that absorbs light and the bottom surfaces thereof are inclined, noise light can further be prevented from entering the light receiving section 94. Also, the light shielding mask 50N of FIG. 13B has a shape that is projected more in the −Z direction compared to the light shielding mask 50M of FIG. 13A. The light shielding mask 50N having a projected shape can expand a range of controlling noise light because the bottom surface thereof is close to the light emitting section 92 and the light receiving section 94.

The non-reflective members 20M and 20N are effective in preventing light emitted from the light emitting section 92 from being reflected on the bottom surface of the holder 20 and preventing noise light from entering the light receiving section 94. As described above, since the non-reflective members 20M and 20N are made of a material that absorbs light and a large number of inclined surfaces are formed on the bottom surfaces thereof, noise light can further be prevented from entering the light receiving section 94.

(Second Embodiment)

Hereinafter, a printing device according the second embodiment will be described with reference to the drawings.

In the printing device according the second embodiment, the configuration of the printing device 10 and the configuration of the ink cartridge 100 as shown in FIG. 1-FIG. 4 are applied with no change; however, the configuration of the holder 20 and the content of the ink near end state detection process are different. Hereinafter, the same elements as the elements of the first embodiment are given the same reference numerals, and detailed explanations thereof will be omitted.

<Configuration of Holder>

FIGS. 14A and 14B are diagrams that explain a configuration of the holder 20 according to the second embodiment. FIG. 14A is a schematic diagram of the bottom surface of the holder 20 viewed from the detecting section 90 side. FIG. 14B is a schematic diagram of the YZ cross-section of the holder 20 and the ink cartridge 100 attached to the holder 20. As shown in FIG. 14A and FIG. 14B, an opening section for position detection 28 and the four opening sections 21a-21d are provided in the bottom surface of the holder 20. The opening section for position detection 28 is formed close to an end portion of the bottom surface of the holder 20 on the Y direction side, and is disposed in a position to face the light emitting section 92 and the light receiving section 94 when the opening section for position detection 28 is located right above the detecting section 90 by moving the holder 20 back and forth. Similarly to the first embodiment, the four ink cartridges 100a-100d are attached in positions that correspond to the opening sections 21a-21d, respectively. Each prism 170, that is similar to the first embodiment, is provided in each ink storing chamber 130 of the ink cartridges 100a-100d. The opening sections 21a-21d are disposed in positions to face the light emitting section 92 and the light receiving section 94 of the detecting section 90, respectively, when each prism 170 of the ink cartridges 100a-100d is located right above the detecting section 90 by moving the holder 20 back and forth. Here, in the main scanning direction HD, the center position of the opening section 21a is spaced apart from the center position of opening section for position detection 28 at the distance a1. Also, similarly to the first embodiment, each center position of the opening sections 21a-21d is spaced apart from the center position of the adjacent opening section at the distance b1.

Figure 15:
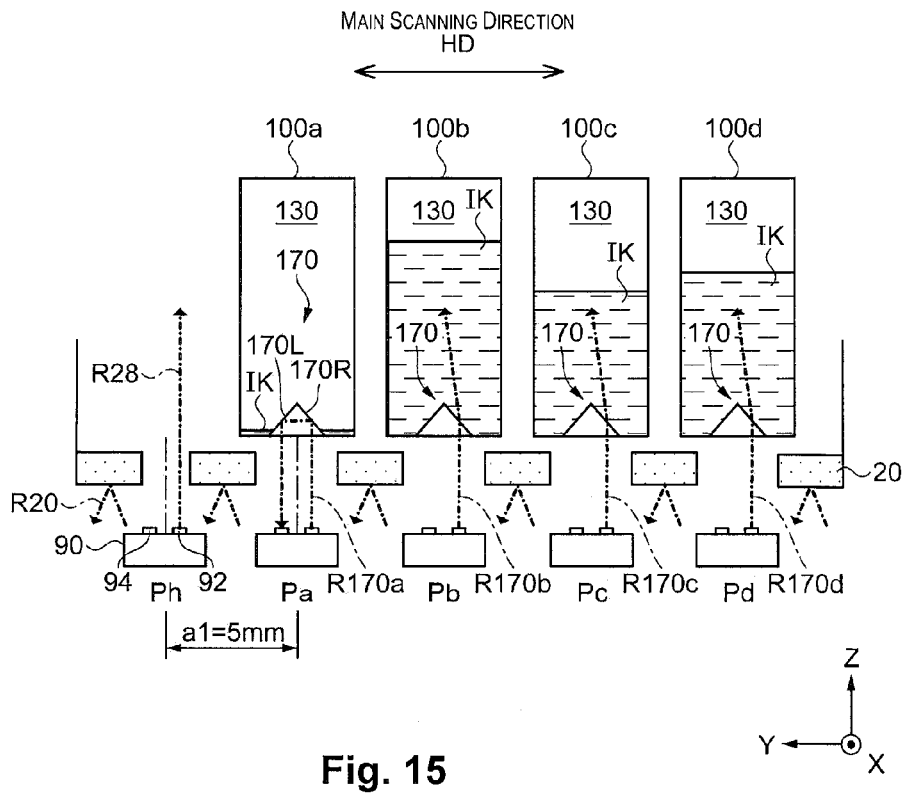
FIG. 15 is a diagram that explains a state of reflected light when light is emitted from a light emitting section according to the second embodiment.

FIG. 15 is a diagram that explains a state of reflected light when light is emitted from the light emitting section 92 according to the second embodiment. When the holder 20 shown in FIG. 15 moves on the detecting section 90 in the main scanning direction HD, the positional relationship between the holder 20 and the detecting section 90 relatively changes as examples of positions Ph, and Pa-Pd shown in FIG. 15. In FIG. 15, the opening section for position detection 28 is located right above the detecting section 90 in the position Ph, and the center position between the light emitting section 92 and the light receiving section 94 substantially coincides with the center position of the opening section for position detection 28 in the main scanning direction HD. In the positions Pa-Pd, the center position between the light emitting section 92 and the light receiving section 94 substantially coincides with the position of the apex angle of the prism 170 in the main scanning direction HD.

Figure 16:
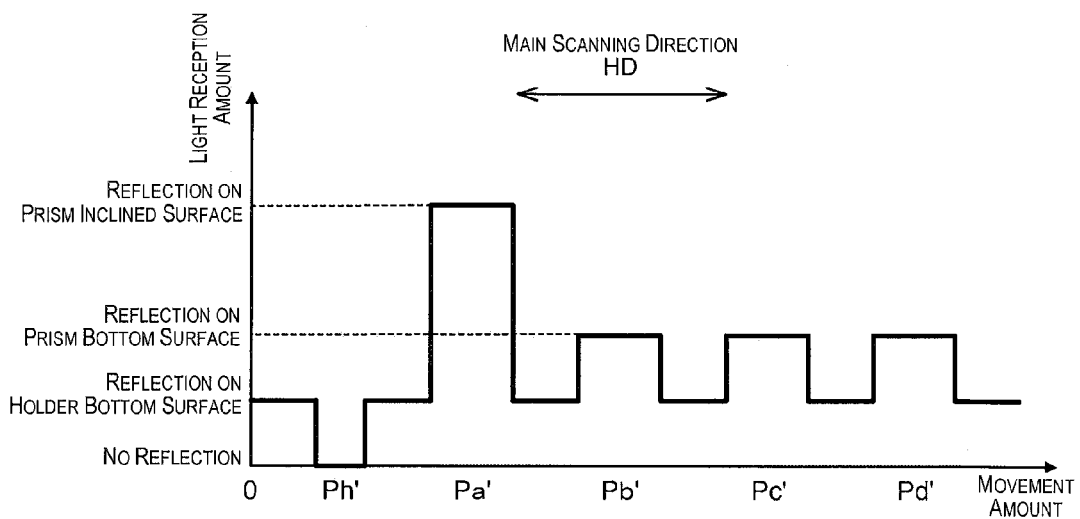
FIG. 16 is a diagram that shows an example of a light reception amount of the detecting section in a state of each reflected light.
Figure 17:
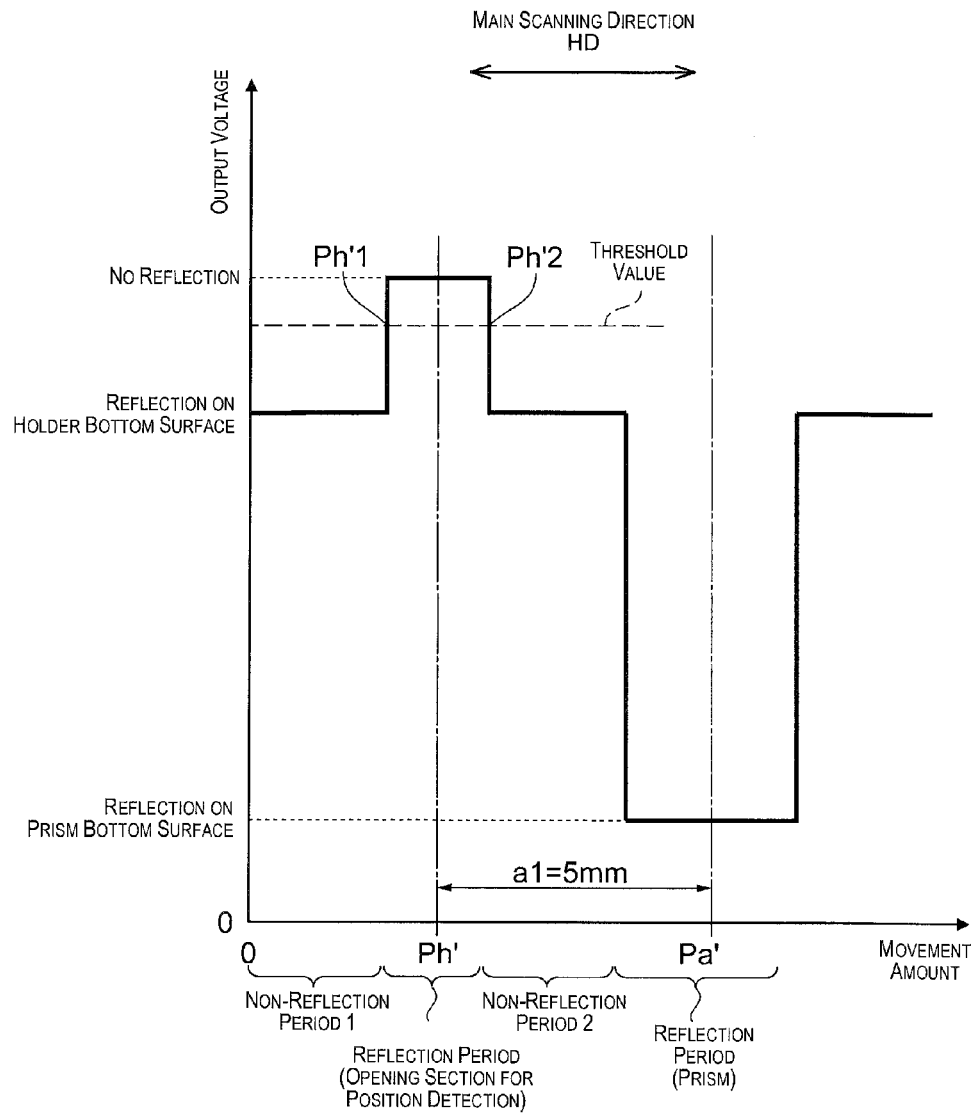
FIG. 17 is a diagram that shows measurement results of an output voltage from the detecting section in a state of each reflected light.

FIG. 16 is a diagram that shows an example of a light reception amount of the detecting section 90 in a state of each reflected light of FIG. 15. The horizontal axis of FIG. 16 represents a movement amount of the holder 20 in the main scanning direction HD, and the vertical axis represents a light reception amount of the detecting section 90 by the light receiving section 94. FIG. 17 is a diagram that shows measurement results of the output voltage from the detecting section 90 in the vicinity of the positions Ph and Pa of FIG. 15. The horizontal axis of FIG. 17 represents a movement amount of the holder 20 in the main scanning direction HD, and the vertical axis represents the output voltage from the detecting section 90. Incidentally, although FIG. 16 and FIG. 17 show the light reception amount and the output voltage by straight lines for easy understanding of the displacement thereof, these are actually curved as in the displacement of the output voltage shown in FIG. 10.

As shown in FIG. 15, when the holder 20 moves from the home position in the main scanning direction HD, the detecting position 90 first faces the bottom surface of the holder 20 close to the end portion of on the Y direction side, and light R20 is emitted from the light emitting section 92 toward the bottom surface of the holder 20. Then, the light R20 emitted from the light emitting section 92 is reflected on the bottom surface of the holder 20, and the reflected light is received by the light receiving section 94. In FIG. 16, a level of the light reception amount in a period in which the detecting position 90 faces the bottom surface of the holder 20 is shown as "reflection on holder bottom surface". Also, in FIG. 17, the period in which the detecting position 90 faces the bottom surface of the holder 20 corresponds to a "reflection period 1".

Subsequently, when the holder 20 further moves in the main scanning direction HD, the detecting position 90 faces the opening section for position detection 28 of the holder 20, and light R28 is emitted from the light emitting section 92 toward the opening section for position detection 28. Then, the light R28 emitted from the light emitting section 92 passes through the opening section for position detection 28, and the light R28 is not received by the light receiving section 94. In FIG. 16, a level of the light reception amount in a period in which the detecting position 90 faces the opening section for position detection 28 (including Ph) is shown as "no reflection". Also, in FIG. 17, the period in which the detecting position 90 faces the opening section for position detection 28 corresponds to a "non-reflection period (opening section for position detection)".

Subsequently, when the holder 20 further moves in the main scanning direction HD, the detecting position 90 faces the bottom surface of the holder 20 again, and light R20 emitted from the light emitting section 92 is reflected on the bottom surface of the holder 20, and the reflected light is received by the light receiving section 94. In FIG. 16, a level of the light reception amount in a period in which the detecting position 90 faces the bottom surface of the holder 20 again is shown as "reflection on holder bottom surface". Also, in FIG. 17, the period in which the detecting position 90 faces the bottom surface of the holder 20 again corresponds to a "reflection period 2".

Subsequently, when the holder 20 further moves in the main scanning direction HD, the detecting position 90 faces the prism 170 of the ink cartridge 100a, and the light R170a is emitted from the light emitting section 92 toward the prism 170. Since the prism 170 is exposed from the ink IK, the light R170a emitted from the light emitting section 92 is totally reflected, and the reflected light is received by the light receiving section 94. Also, part of the light R170a emitted from the light emitting section 92 is reflected on the bottom surface of the prism 170, and the reflected light is received by the light receiving section 94. In FIG. 16, a level of the light reception amount in a period in which the detecting position 90 faces the prism 170 of the ink cartridge 100a (including Pa) is shown as "reflection on prism inclined surface". Also, in FIG. 17, the period in which the detecting position 90 faces the prism 170 of the ink cartridge 100a corresponds to a "reflection period (prism)".

Subsequently, when the holder 20 further moves in the main scanning direction HD, the detecting position 90 faces the bottom surface of the holder 20 again, and light R20 emitted from the light emitting section 92 is reflected on the bottom surface of the holder 20, and the reflected light is received by the light receiving section 94.

Subsequently, when the holder 20 further moves in the main scanning direction HD, the detecting position 90 faces the prism 170 of the ink cartridge 100b, and the light R170b is emitted from the light emitting section 92 toward the prism 170. Since the prism 170 is not exposed from the ink IK, the light R170b emitted from the light emitting section 92 transmits the prism 170, and is absorbed in the ink IK. However, part of the light R170b is reflected on the bottom surface of the prism 170, and the reflected light is received by the light receiving section 94. In FIG. 16, a level of the light reception amount in a period in which the detecting position 90 faces the prism 170 of the ink cartridge 100a (including Pb) is shown as "reflection on prism inclined surface".

Subsequently, when the holder 20 further moves in the main scanning direction HD, the detecting position 90 faces the bottom surface of the holder 20 again, and sequentially faces the prisms 170 of the ink cartridge 100c and the ink cartridge 100d. However, since this is similar to the case of facing the prism 170 of the ink cartridge 100b, explanations thereof will be omitted.

<Ink Near End State Detection Process>

Figure 18:
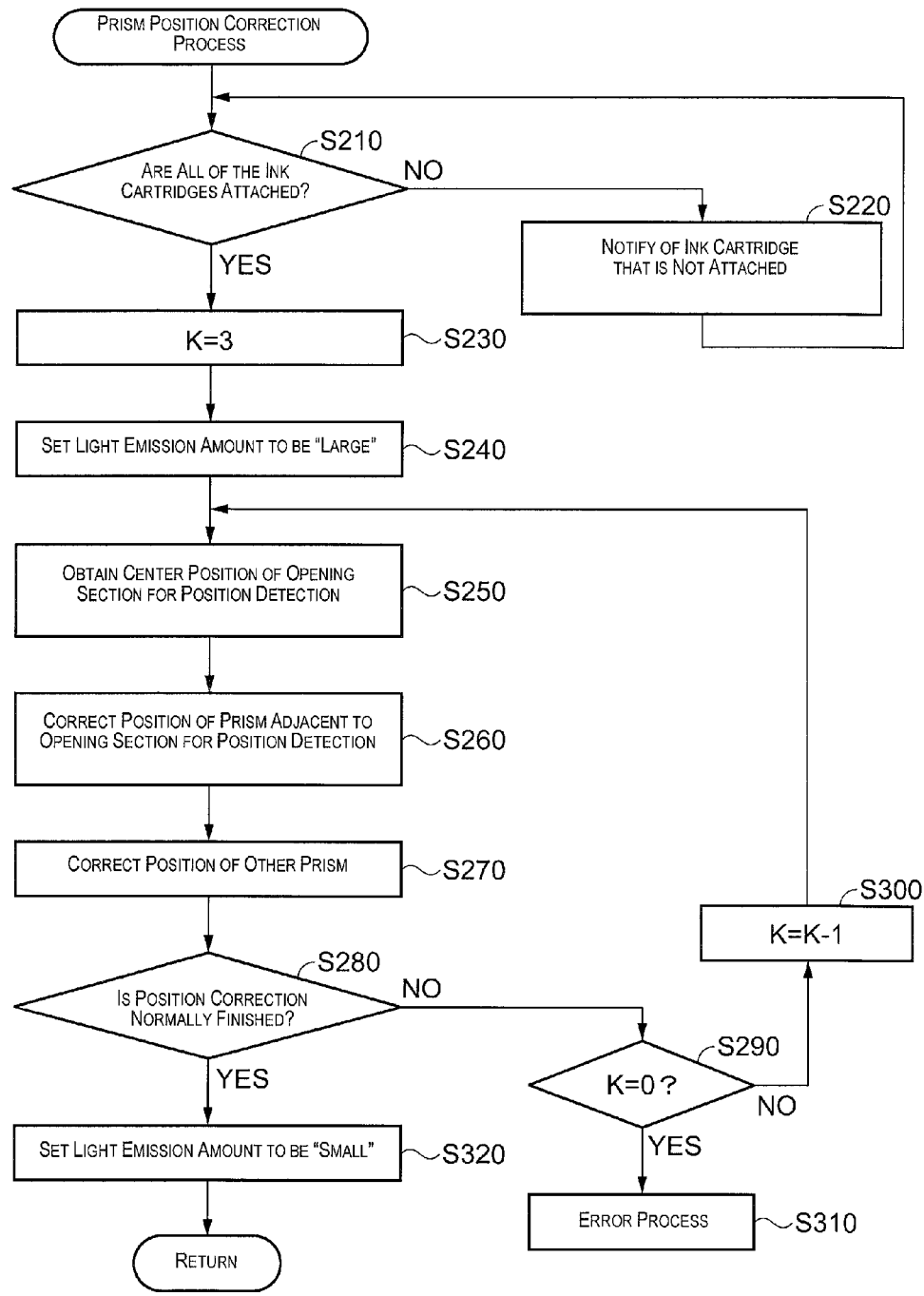
FIG. 18 is a flow chart of the details of the position correction process of the prism according to the second embodiment.

Next, explanations will be made on a process of determining whether ink in the ink cartridge 100 is in an ink near end state or not. In the ink near end detection process according to the second embodiment, the flow chart of the ink near end detection process shown in FIG. 7 can be applied. However, the content of the prism position correction process of step S10 is different. FIG. 18 is a flow chart of the details of the position correction process of the prism 170 according to the second embodiment.

Explanations will be made on the prism position correction process according to the second embodiment shown in the flow chart of FIG. 18.

First, the control unit 40 determines whether all of the ink cartridges 100a-100d are attached to the holder 20 or not (step S210). Here, the control unit 40 determines whether all of the ink cartridges 100a-100d are correctly attached or not by accessing a storing device of the ink cartridge 100 attached to the holder 20 in the home position, for example. In a case where all of the ink cartridges 100a-100d are attached (step S210: YES), the process moves on to step S230. On the other hand, in a case where there is an ink cartridge 100 that is not attached (step S210: NO), notification is issued to a user by displaying identification and the like of the ink cartridge 100, that is not attached, on the display panel 70 or the computer 60 (step S220). Then, the process returns to step S210, and waits for all of the ink cartridges 100a-100d to be attached.

In step S230, the control unit 40 sets the number of retries K in a case where the position correction of the prism 170 is not normally conducted to "3". Then, the control unit 40 sets the light emission amount of the light emitting section 92 to be "large" by modulating light through PWM control of the light emitting section 92 (step S240). Setting the light emission amount to be "large" is setting the light emission amount of light emitted from the light emitting section 92 when the position correction process of the prism 170 is conducted.

Next, after the control unit 40 causes the light emitting section 92 to emit light with the setting of the "large" light emission amount, the control unit 40 moves the holder 20 in the main scanning direction HD such that the opening section for position detection 28 of the holder 20 passes over the detecting section 90. Then, the center position of the opening section for position detection 28 in the main scanning direction HD is obtained based on the change in the reflected light when the opening section for position detection 28 passes over the detecting section 90 (step S250). In the examples of FIG. 15 to FIG. 17, the control unit 40 obtains the center position of the opening section for position detection 28 based on the change in the level of the light reception amount of "reflection on holder bottom surface"→"no reflection"→"reflection on holder bottom surface" due to the movement of the holder 20 from the home position. Specifically, the control unit 40 obtains the center position of the opening section for position detection 28 based on the displacement of the output voltage in "reflection period 1"→"non-reflection period (opening section for position detection)"→"reflection period 2" shown in FIG. 17. More specifically, first, the control unit 40 sets a threshold value of the output voltage for the opening section for position detection 28. Then, the control unit 40 considers the intersection point between the threshold value and the output voltage that gradually increases as one optical end section Ph'1 with respect to the opening section for position detection 28, and considers the intersection point between the threshold value and the output voltage that gradually decreases as the other optical end section Ph'2 with respect to the opening section for position detection 28. Then, the control unit 40 considers the center position between the optical end section Ph'1 and the optical end section Ph'2 as a center position Ph' of the opening section for position detection 28. Specifically, an optical position corresponding to the center position Ph of the opening section for position detection 28 shown in FIG. 15 is obtained as the center position Ph' of the opening section for position detection 28 shown in FIG. 17 based on the output voltage from the detecting section 90.

As described above, in step S250, light is emitted from the light emitting section 92 with the setting of the "large" light emission amount. This is because the level of the light reception amount of "reflection on holder bottom surface" is smaller than the level of the light reception amount of "reflection on prism bottom surface" and "reflection on prism inclined surface". Therefore, light is emitted toward the bottom surface of the holder 20 with the setting of the "large" light emission amount, so that the level of the light reception amount of "reflection on holder bottom surface" is made large. As a result, the accuracy of the center position Ph' of the opening section for position detection 28 can be improved.

Next, based on the center position of the opening section for position detection 28 obtained in the step S250, the control unit 40 corrects the position in the main scanning direction HD of the prism 170 of the ink cartridge 100a adjacent to the opening section for position detection 28 (step S260). In the examples of FIG. 15 to FIG. 17, the control unit 40 obtains a center position Pa' of the prism 170 of the ink cartridge 100a based on the obtained center position Ph' of the opening section for position detection 28, and corrects the center position Pa' in a case where there is position displacement with respect to the center position Pa that is the reference of measurement by the detecting section 90. More specifically, first, the control unit 40 obtains the center position Pa' of the prism 170 of the ink cartridge 100a based on the obtained center position Ph' of the opening section for position detection 28. In the present embodiment, the distance a1 from the center position Ph of the opening section for position detection 28 to the center position Pa of the prism 170 of the ink cartridge 100a shown in FIG. 15 is set to 5 mm. Accordingly, the position Pa' spaced apart from the center position Ph' of the opening section for position detection 28 shown in FIG. 17 by 5 mm is obtained as the center position Pa' of the prism 170. Then, in a case where the obtained center position Pa' of the prism 170 is different from the center position Pa of the prism 170 that is the reference shown in FIG. 15, the center position of the prism 170 used for measurement by the detecting section 90 is corrected to be the center position Pa'.

Next, the control unit 40 corrects the positions of the prisms 170 of the other ink cartridges 100b-100d in the main scanning direction HD similarly to the prism 170 of the ink cartridge 100a based on the fact that the intervals of the adjacent openings 21a, 21b, 21c, and 21d are the distance b1, respectively, as shown in FIGS. 14A and 14B (step S270). Incidentally, Pb' - Pd' in FIG. 16 show the center positions of the prisms 170 of the ink cartridges 100b-100d, respectively, which are obtained based on the center position Pa' of the prism 170 of the ink cartridge 100a.

Next, the control unit 40 determines whether the position correction process of the prism 170 is normally finished in each prism 170 of the ink cartridges 100a-100d (step S280).

In a case where the position correction process is normally finished in all of the ink cartridges 100a-100d (step S280: YES), the control unit 40 sets the light emission amount of the light emitting section 92 to be "small" by modulating light through PWM control of the light emitting section 92 (step S320), and the position correction process of the prism 170 is finished. Setting the light emission amount to be "small" is setting the light emission amount of light emitted from the light emitting section 92 when the output voltage with respect to each prism 170 is measured by the detecting section 90. Since the level of the light reception amount of "reflection on prism bottom surface" and "reflection on prism inclined surface" shown in FIG. 16 are larger than the level of the light reception amount of "reflection on holder bottom surface", the light emission amount is set to be "small" here.

On the other hand, in a case where there is an ink cartridge in which the position correction process is not normally finished (step S280: NO), it is determined whether the number of retries K is "0" or not (step S290). In a case where the number of retries K is "0" (step S290: YES), an error display or the like indicating "abnormally finished" is shown on the display panel 70 or the computer 60, and all the processes in the printing device 10 is finished (step S310). On the other hand, in a case where the number of retries K is not "0" (step S290: NO), one is subtracted from the number of retries K, and the process returns to step S250 so as to retry the process of obtaining the center position of the opening section for position detection 28. Since the number of retries K is set to "3" in step S230, the retry process is conducted three times at a maximum. However, the number of retries K is not limited to "3", and can be set optionally. Also, the retry process may be omitted, and an error process may be conducted without fail when the position correction process is not normally finished.

As shown in the flow chart of FIG. 7, by conducting steps S20 to S70, the control unit 40 measures the output voltage from the detecting section 90 with respect to each prism 170 of the ink cartridges 100a-100d, determines whether it is in an ink near end state with respect to each of the ink cartridges 100a-100d, and displays the remaining state of the ink IK in the ink cartridges 100a-100d. The details of steps S20 to S70 will not be explained because they were already explained in the first embodiment.

As described above, in the present embodiment, the opening sections 21a-21d are provided in the bottom surface of the holder 20, and the opening section for position detection 28 is provided in a position spaced apart from the opening section 21a by a predetermined distance. The optical position of the opening section for position detection 28 is obtained based on the change in the reflected light of light emitted from the detecting section 90 when the opening section for position detection 28 passes over the detecting section 90, and the position correction is conducted by specifying the position of each prism 170 of the ink cartridges 100a-100d based on the optical position of the opening section for position detection 28. In this manner, the optical position of the opening section for position detection 28 is obtained by the reflected light of light emitted from the detecting section 90, and the position of each prism 170 is corrected based on the obtained optical position of the opening section for position detection 28. Therefore, even in a case where an error occurs in the attachment position of the detecting section 90 or the holder 20 in the printing device 10, for example, determination of an ink near end state can be conducted based on the reflected light from each prism 170 received in a correct position. Consequently, determination of an ink near end state can be conducted with respect to each of the ink cartridges 100a-100d with high accuracy. Also, since this is a simple configuration in which the opening section for position detection 28 as the non-reflective region is provided in the bottom surface of the holder 20 and the bottom surface of the holder 20 is used as the reflective region, the position correction of each prism 170 can be easily achieved. Further, compared to the case where the position of each prism 170 is corrected with the reflective plate 25 or the like provided in the holder 20, the influence of ink mist can be avoided in the opening section for position detection 28, and thus, determination of an ink near end state can be conducted stably with high accuracy even when time passes.

(Modified Example of Second Embodiment)

Hereinafter, a modified example of the second embodiment will be described.

Figure 19A:
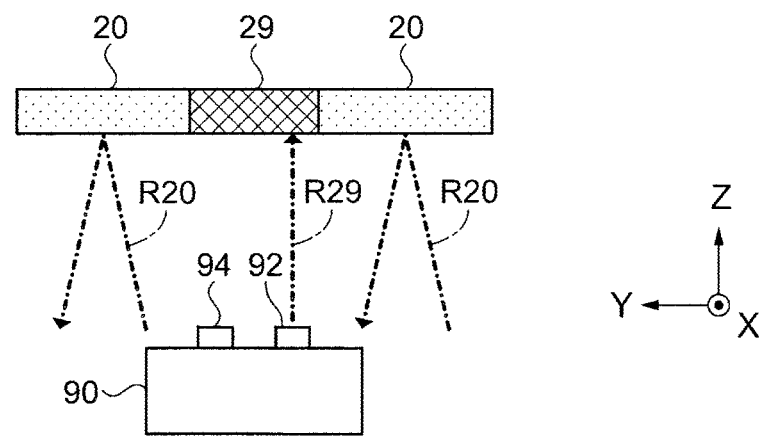
FIGS. 19A and 19B are diagrams of a configuration of the vicinity of a non-reflective member provided in the holder according to a modified example of the second embodiment.
Figure 19B:
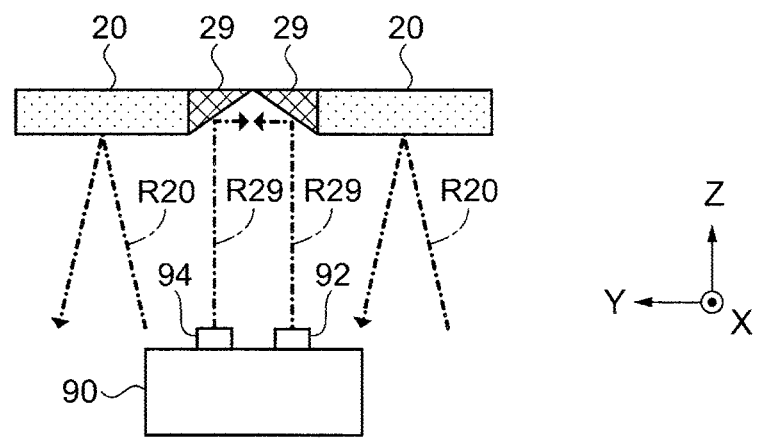

In the modified example of the second embodiment, a non-reflective member 29 is provided instead of the opening section for position detection 28 in the holder 20. FIGS. 19A and 19B are diagrams of a configuration of the vicinity of the non-reflective member 29 provided in the holder 20 according to the modified example of the second embodiment. In FIG. 19A, an area that corresponds to the opening section for position detection 28 is sealed with the non-reflective member 29, and the bottom surface of the non-reflective member 29 is substantially in parallel with the main scanning direction HD (Y axis direction). In FIG. 19B, an area that corresponds to the opening section for position detection 28 is sealed with the non-reflective members 29 and 29 which are inclined with respect to the main scanning direction HD so as to face each other. As described above, an area that corresponds to the opening section for position detection 28 may be sealed with the non-reflective member 29, and used as the non-reflective region. Instead of sealing an area that corresponds to the opening section for position detection 28 with the non-reflective member, a non-reflective member may be provided or a non-reflective material may be coated on the bottom surface of the holder 20.

Also, the opening section for position detection 28 (alternatively, non-reflective member or non-reflective material) may be provided in a plurality of areas of the holder 20, and the optical position may be obtained in each area, so as to correct the position of each prism 170 with higher accuracy.

(Other)

In the above-described embodiments, the non-reflective member is inclined with respect to the main scanning direction HD. However, the direction is not limited to the main scanning direction HD. For example, the non-reflective member may be inclined with respect to the sub scanning direction VD, or may be inclined with respect to both of the main scanning direction HD and the sub scanning direction VD, as long as it is possible to prevent reflected light on the non-reflective member from entering the light receiving section 94.

In the above-described embodiments, the position of each prism 170 is corrected and the remaining state of ink is measured by moving the holder 20 back and forth in the main scanning direction HD above the fixed detecting section 90. However, the present invention is not limited to this, and the detecting section 90 may move back and forth in the main scanning direction HD. In sum, it is sufficient that the detecting section 90 and the holder 20 move relatively with respect to each other. The present invention can also be applied to a case where the holder for accommodating the ink cartridge is in a fixed position and the detecting section is located in the carriage provided with the head (the detecting section moves with respect to the holder).

Also, in the above embodiments, a case where the present invention is applied to a printing device and an ink cartridge was explained as an example. However, the present invention may be used for a liquid consumption device that sprays or ejects liquid other than ink. Further, the present invention can also be used for various kinds of liquid consumption devices provided with a liquid spray head or the like that ejects minute amounts of ink drops. "Ink drops" refer to a state of liquid ejected from the above-described liquid consumption device, and include ones that trail in a grain shape, a tear shape, or a string shape. Also, it is sufficient for the "liquid" described here to be made of a material that can be sprayed by the liquid consumption device. For example, a material in a state of the liquid phase is sufficient, including a liquid body having high or low viscosity, sol, gel water, a fluid body such as an inorganic solvent, an organic solvent, a solution, liquid resin, liquid metal (metal melt), and one in which particles of a functional material consisting of a solid material such as a pigment or metal particles are dissolved, dispersed, or mixed into a solvent, as well as liquid as a state of a material. Also, as a representative example of liquid, ink described in the above embodiment, liquid crystal, and the like can be listed. Here, ink includes common water-based ink, oil-based ink, and various kinds of liquid compositions such as gel ink, hot melt ink, or the like. Specific examples of the liquid consumption device include a liquid crystal display, an EL (electroluminescence) display, a surface emitting display, a liquid consumption device that sprays liquid containing an electrode material or a color material used for manufacturing a color filter in a form of dispersion or dissolution, a liquid consumption device that sprays a living organic material used for manufacturing a biochip, and a liquid consumption device that is used as a precision pipette and sprays liquid serving as a sample. Further, it is possible to employ a liquid consumption device that sprays lubricant oil to a precision instrument such as a timepiece or a camera by pinpointing, a liquid consumption device that sprays transparent resin liquid such as ultraviolet curable resin to a substrate for forming a hemispherical micro lens (optical lens) or the like used for an optical communication device or the like, and a liquid consumption device that sprays etching liquid such as acid or alkali for etching of a substrate or the like.

The entire disclosure of Japanese Patent Application No. 2012-122792 filed Oct. 29, 2013 is expressly incorporated by reference herein.

The invention claimed is:

1. A liquid consumption device comprising:
a holder to which a liquid reservoir section provided with a prism is attached and being provided an opening section in a position to face the prism of the attached liquid reservoir section;
a light emitting section that emits light;
a light receiving section that receives reflected light of light emitted from the light emitting section; and
a moving section that moves the holder relative to the light emitting section and the light receiving section in a main scanning direction,
wherein the holder has a region that changes a light amount of the reflected light emitted from the light emitting section and received by the light receiving section according to a change in a relative positional relationship between the holder and the light emitting section and the light receiving section in the main scanning direction regardless of whether the liquid reservoir section is attached to the holder or not, the region being disposed in a position spaced apart from the opening section at a predetermined distance in the main scanning direction,
the region that changes a light amount of the reflected light includes a reflective region that reflects the reflected light toward the light receiving section, and a non-reflective region that lowers reflection of the reflected light toward the light receiving section than reflection of the reflected light from the reflective region, and
the non-reflective region is disposed at both ends of the reflective region in the main scanning direction.

2. The liquid consumption device according to claim 1, wherein the reflective region is provided on a bottom surface of a recessed portion formed in the holder so as to face the light emitting section and the light receiving section.

3. The liquid consumption device according to claim 1, wherein the non-reflective region has a surface inclined with respect to the main scanning direction.

4. The liquid consumption device according to claim 1, wherein the non-reflective region has a surface inclined with respect to a bottom surface of the prism.

5. The liquid consumption device according to claim 1, further comprising
a control unit configured to obtain a position of the prism based on the light amount of the reflected light reflected by the region in the holder.

6. The liquid consumption device according to claim 1, wherein the liquid reservoir section and the region that changes a light amount of the reflected light do not overlap each other when viewed from the light emitting section and the light receiving section.

7. A liquid consumption device comprising:
a holder to which a liquid reservoir section provided with a prism is attached and being provided an opening section in a position to face the prism of the attached liquid reservoir section;
a light emitting section that emits light;
a light receiving section that receives reflected light of light emitted from the light emitting section; and
a moving section that moves the holder relative to the light emitting section and the light receiving section in a main scanning direction,
wherein the holder has a region that changes a light amount of the reflected light emitted from the light emitting section and received by the light receiving section according to a change in a relative positional relationship between the holder and the light emitting section and the light receiving section in the main scanning direction regardless of whether the liquid reservoir section is attached to the holder or not, the region being disposed in a position spaced apart from the opening section at a predetermined distance in the main scanning direction,
the region that changes a light amount of the reflected light includes a reflective region that reflects the reflected light toward the light receiving section, and a non-reflective region that lowers reflection of the reflected light toward the light receiving section than reflection of the reflected light from the reflective region, and
the reflective region is disposed at both ends of the non-reflective region in the main scanning direction.

8. The liquid consumption device according to claim 7, wherein the non-reflective region is an opening region.

9. The liquid consumption device according to claim 8, wherein the reflective region is a bottom surface of the holder.

10. The liquid consumption device according to claim 9, wherein a light amount emitted from the light emitting section toward the reflective region is larger than a light amount emitted toward the prism.

11. The liquid consumption device according to claim 7, wherein the non-reflective region has a surface inclined with respect to the main scanning direction.

12. The liquid consumption device according to claim 7, wherein the non-reflective region has a surface inclined with respect to a bottom surface of the prism.

13. The liquid consumption device according to claim 7, further comprising
   a control unit configured to obtain a position of the prism based on the light amount of the reflected light reflected by the region in the holder.

14. The liquid consumption device according to claim 7, wherein the liquid reservoir section and the region that changes a light amount of the reflected light do not overlap each other when viewed from the light emitting section and the light receiving section.

* * * * *